United States Patent
Possignolo et al.

(10) Patent No.: US 11,599,700 B2
(45) Date of Patent: *Mar. 7, 2023

(54) STRUCTURAL MATCHING FOR FAST RE-SYNTHESIS OF ELECTRONIC CIRCUITS

(71) Applicant: The Regents of the University of California, Oakland, CA (US)

(72) Inventors: Rafael Possignolo, Santa Cruz, CA (US); Jose Renau, Santa Cruz, CA (US)

(73) Assignee: THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/247,085

(22) Filed: Nov. 30, 2020

(65) Prior Publication Data

US 2021/0110092 A1   Apr. 15, 2021

Related U.S. Application Data

(63) Continuation of application No. 16/662,092, filed on Oct. 24, 2019, now Pat. No. 10,885,246.

(Continued)

(51) Int. Cl.
*G06F 30/327* (2020.01)
*G06F 30/331* (2020.01)
(Continued)

(52) U.S. Cl.
CPC .......... *G06F 30/327* (2020.01); *G06F 30/331* (2020.01); *G06F 30/392* (2020.01); *G06F 30/398* (2020.01); *G06F 30/396* (2020.01)

(58) Field of Classification Search
CPC .... G06F 30/327; G06F 30/331; G06F 30/392; G06F 30/398; G06F 30/396; G06F 2119/20; G06F 30/347
See application file for complete search history.

(56) References Cited

U.S. PATENT DOCUMENTS 10,885,246 B2 *   1/2021   Possignolo ........... G06F 30/392

OTHER PUBLICATIONS

Altera Inc., Altera: FPGA Architecture White Paper, 2006, pp. 1-14.
(Continued)

*Primary Examiner* — Stacy Whitmore
(74) *Attorney, Agent, or Firm* — Wolter Van Dyke Davis, PLLC; Eugene J. Molinelli

(57) ABSTRACT

Techniques include retrieving a first structural netlist (SN1) that indicates electronic components, values of programmable parameters, and connections for a first electronic circuit, and retrieving a first placed and routed netlist (PR1) that indicates physical placement of the electronic components and physical routing of connections for SN1. Also retrieved is a second structural netlist (SN2) for a different second electronic circuit. For each component in SN2, a matching component, if any, is found in SN1 based on type of component and inputs that are output from other matching components. A different second placed and routed netlist (PR2) is generated for the second circuit by deriving new placement and routing for only for non-matching components in SN2.

18 Claims, 15 Drawing Sheets

Related U.S. Application Data

(60) Provisional application No. 62/751,179, filed on Oct. 26, 2018.

(51) Int. Cl.
  G06F 30/392 (2020.01)
  G06F 30/398 (2020.01)
  G06F 30/396 (2020.01)

(56) References Cited

OTHER PUBLICATIONS

Altera Inc., Quartus Prime Standard Edition Handbook vol. 1:Design and Synthesis, Intel, 2016, pp. 1-1096.
Altera Inc., Cyclone V Device Overview, Intel, 2017, pp. 1-37.
Brand et al., Incremental Synthesis, in Proc. of the 1994 IEEE/ACM Int'l Conf. on Computer-aided Design (ICCAD 94) IEEE Computer Society, 1994, pp. 14-18.
Brayton and Mishchenko, ABC: An Academic Industrial-strength Verification Tool, in Proceedings of the 22Nd International Conference on Computer Aided Verification (CAV'10), 2010, pp. 24-40.
Chen and Singh, Line-level Incremental Resynthesis Techniques for FPGAs, in Proceedings of the 19th ACM/SIGDA International Symposium on Field Programmable Gate Arrays (FPGA '11), 2011, pp. 133-142.
Cong et al., An Implicit Connection Graph Maze Routing Algorithm for ECO Routing, in Proceedings of the 1999 IEEE/ACM International Conference on Computer-aided Design (ICCAD '99), 1999, pp. 163-167.
Cortadella et al., RTL Synthesis: From Logic Synthesis to Automatic Pipelining. Proc. IEEE 103, 2015, pp. 2061-2075.
Dehkordi et al., Modular Partitioning for Incremental Compilation, International Conference on in Field Programmable Logic (FPL) and Applications, 2006, pp. 1-6.
Ganusov et al., Automated Extra Pipeline Analysis of Applications Mapped to Xilinx UltraScale+ FPGAs, Proceedings of the 26th Conference in Field Programmable Logic and Applications (FPL), 2016.
Huang and Wong, OpenTimer: A high-performance timing analysis tool, in 2015 IEEE/ACM International Conference on Computer-Aided Design (ICCAD), 2015, pp. 895-902.
Hurst et al., Fast Minimum-Register Retiming via Binary Maximum-Flow, in Proceedings of the Formal Methods in Computer Aided Design (FMCAD '07), 2007, pp. 181-187.
Jouppi, Timing analysis and performance improvement of MOS VLSI designs, IEEE Transactions on Computer Aided Design, 1987, pp. 650-665, vol. CAD-6.
Kim et al., Strober: Fast and Accurate Sample-based Energy Simulation for Arbitrary RTL. In Proceedings of the 43rd International Symposium on Computer Architecture (ISCA '16), 2016, pp. 128-139.
Lee et al., iTimerC2.0: Fast incremental timing and CPPR analysis, in 2015 IEEE/ACM International Conference on Computer-Aided Design (ICCAD), 2015, pp. 890-894.
Leiseerson and Saxe, Retiming Synchronous Circuitry, Algorithmica 6, 1991, pp. 5-35.
Modi and Marek-Sadowska, ECO-Map: Technology remapping for post-mask ECO using simulated annealing, in 2008 IEEE International Conference on Computer Design, 2008, pp. 652-657.
Possignolo et al., FluidPipelines: Elastic Circuitry meets Out-of-Order Execution, Proceedings of the 34th International Conference in Computer Design (ICCD), 2016.
Possignolo et al., Anubis: A New Benchmark for Incremental Synthesis, Proceedings of the 2017 International Workshop on In Logic Synthesis (IWLS), 2017.
Possignolo and Renau, LiveSynth: Towards an interactive synthesis flow, Proceedings of the In 53rd Design Automation Conference, 2017.
Raman et al., Cone Resynthesis ECO Methodology for Multi-Million Gate Designs, 2009.
Sathyanathan et al., Incremental whole program optimization and compilation, in 2017 IEEE/ACM International Symposium on Code Generation and Optimization (CGO), 2017, pp. 221-232.
Wolf, Yosys Open SYnthesis Suite, 2016, 150 pages.
Xilixn Inc., Vivado Synthesis—Strategies for reducing run time, 2015.
Xilixn Inc., Vivado Design Suite User Guide, Apr. 2016.

\* cited by examiner

ELABORATED NETLIST

CIRCUIT BOARD STRUCTURAL NETLIST

FPGA STRUCTURAL NETLIST

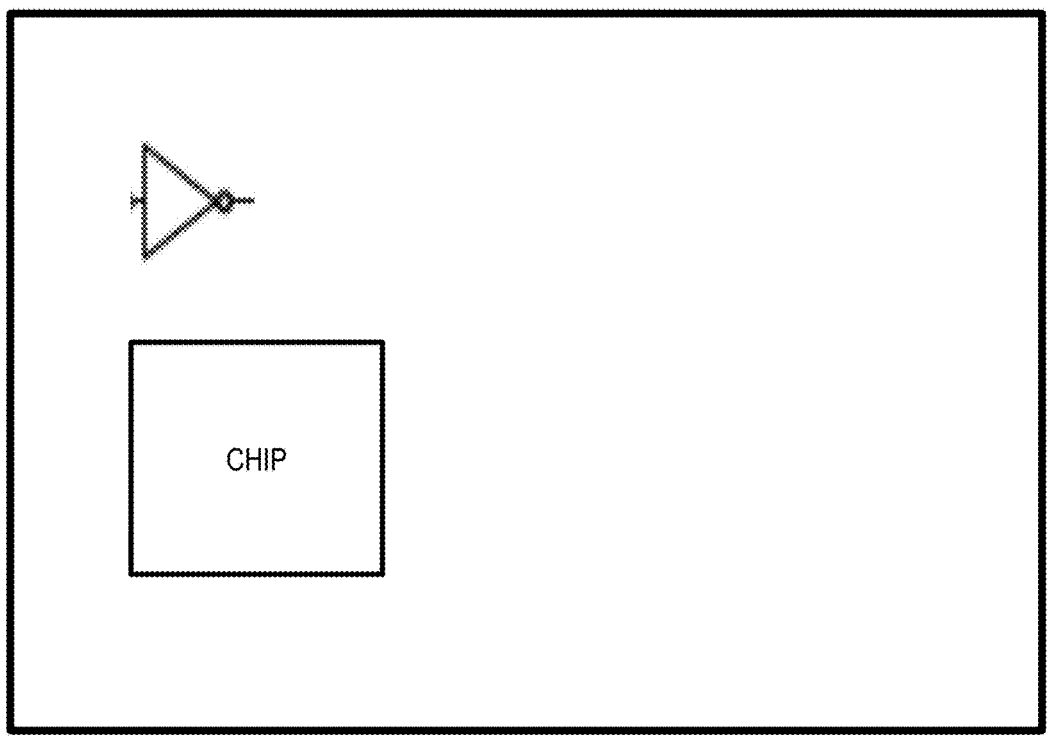
ELECTRONIC CIRCUIT PLACED NETLIST        FIG. 4A
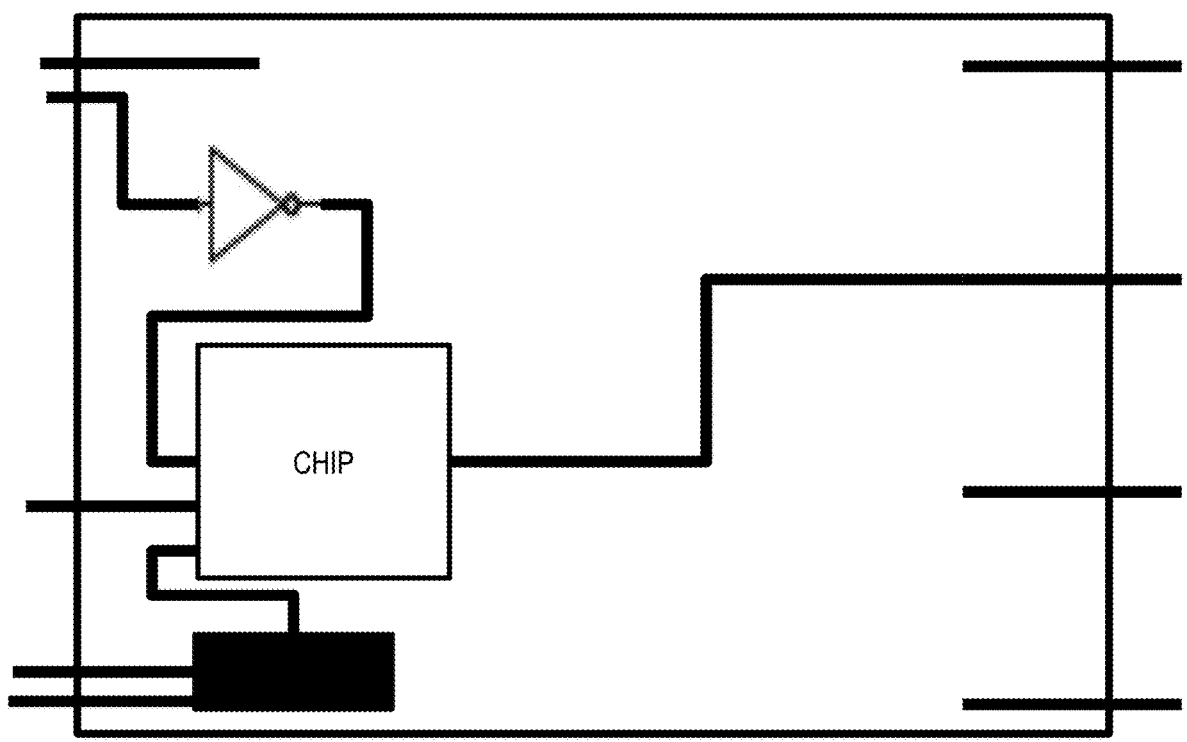
ELECTRONIC CIRCUIT P&R NETLIST        FIG. 4B

FPGA PLACED NETLIST

FPGA P&R NETLIST

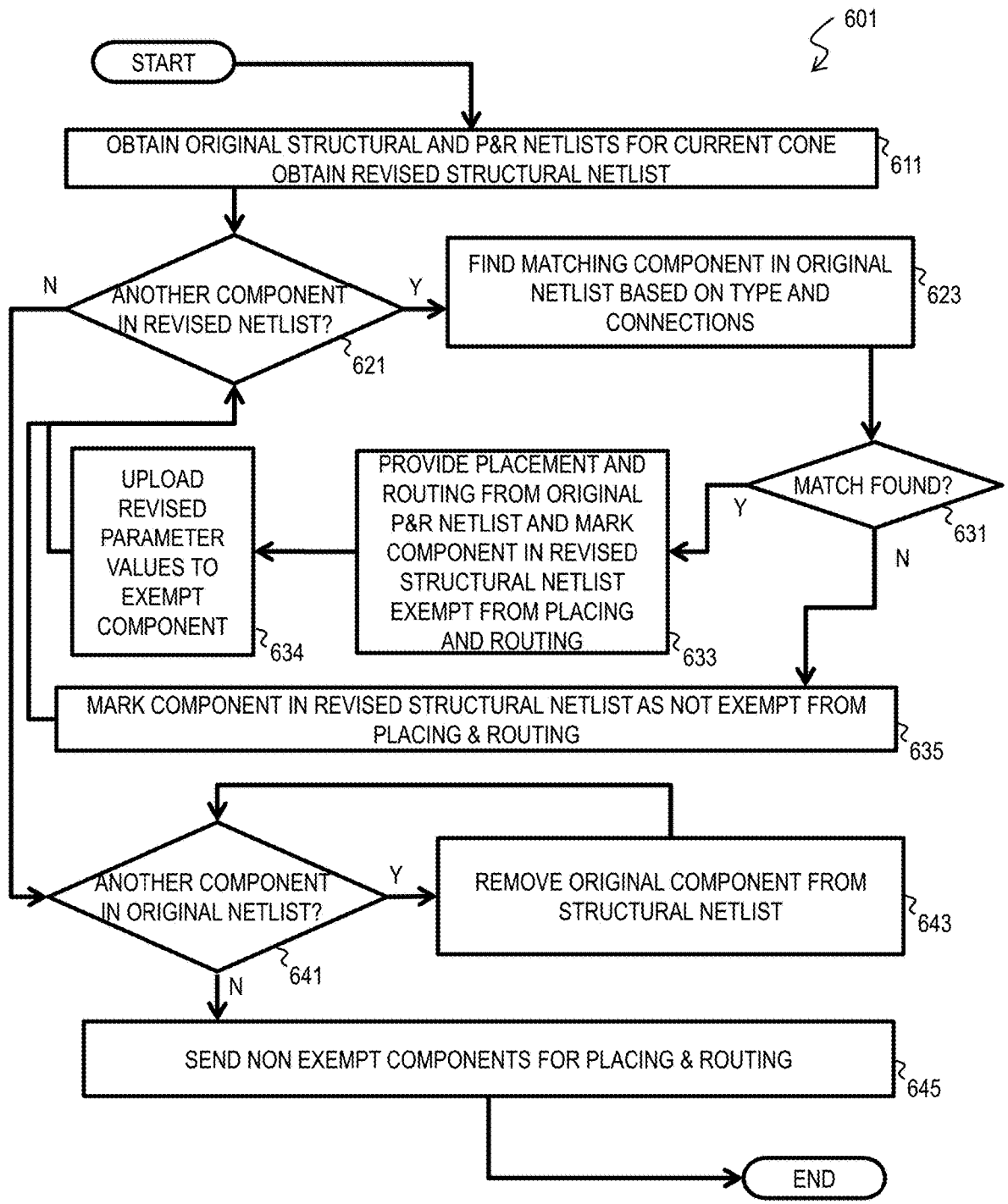
FIG. 6 (Updated)

ORIGINAL OR FIRST STRUCTURAL NETLIST

FIRST STRUCTURAL NETLIST WITH UPDATED LUT

FIRST STRUCTURAL NETLIST WITH UPDATED LUT AND ADDITIONAL LUT

Xilinx Slices

Intel ALMs

STRUCTURAL MATCHING FOR FAST RE-SYNTHESIS OF ELECTRONIC CIRCUITS

CROSS-REFERENCE TO RELATED APPLICATIONS

This application claims benefit as Continuation of application Ser. No. 16/662,092 filed Oct. 24, 2019, under 35 U.S.C. § 120 which claims priority of Provisional Appln. 62/751,179, filed Oct. 26, 2018, the entire contents of which are hereby incorporated by reference as if fully set forth herein, under 35 U.S.C. § 119(e).

STATEMENT OF GOVERNMENTAL INTEREST

This invention was made with government support under Grant Nos. CNS-1059442-003, CNS-1318943-001, CCF-1337278, and CCF-1514284 awarded by the National Science Foundation. The government has certain rights in the invention.

BACKGROUND

In the field of Electronic Design Automation, the processes of elaboration, synthesis, placement and routing occupy the bulk of the time of the design workflow. An ordinary design cycle usually comprises a design stage by the user, followed by an elaboration stage, a synthesis stage, a place and route stage, a timing analysis, and a programing and configuration stage. Typically, computers are used to perform these steps in a commercially feasible manner.

The complexity and intricacy of the current target devices command the processing power of dedicated computers in order to achieve business viability in the design process. The design cycles for Very-Large Scale Integration circuits (VLSI) and Field Programable Gate Arrays (FPGA) take hours of design, followed by a sometimes comparable if not larger wait time while the system synthesizes the design and optimizes for the placement and routing of the components in the target device. Such long processing times are involved even for minor changes.

It will be appreciated that the hardware components include registers, flip-flops, dedicated logic gates, and multiplexers, among others. It will be further appreciated that synthesis is the process of selecting which hardware components will be used to perform a corresponding function or function set of the circuit designed by the engineers. Placing is the process of giving spatial coordinates for the components. On the other hand, routing is the process of interconnecting the hardware components, e.g., using the internal routing elements of the target device, such as conductors, branches and diodes. Additionally, placing and routing may have multiple sub-process that may be taken into consideration. As an example, during the placement and routing process the system may analyze the impact on power consumption or on the overall availability of resources on the device.

At the end of a placement and routing process, designers and engineers will test the resulting design through software simulations of real-life situations. Frequently, testing and simulation yields data that suggests improvements and updates that result in changes to the original design, thus, the steps of elaboration, synthesis, placement and routing must be repeated as well. It will be appreciated that any improvements that streamline these processes translate to increase commercial appeal.

SUMMARY

It is here recognized that advantages accrue by reusing portions of electronic circuit design, not only for FPGA but also for other complex circuits. The complexity of field programable circuits and application-specific circuits increases exponentially year over year. Currently, complex circuits contain in the range of one million programmable elements that can encode tens of trillions of simple logic gates. More importantly, in electronic designs where over 100,000 gates are used, a design change that specifies a few thousand gates can impact 3 to 4 times as many gates. As an example, a design change encompassing 5,000 gates can affect 19,000 gates and require 12 to 14 man-day efforts to be accomplished manually. Techniques are provided for automatic detection of reusable portions of a circuit design and for the automatic reuse of such sections when generating computer aided circuit diagrams for electronic circuit construction, so that they can be accomplished in less than one day. As used herein, a field programmable gate array (FPGA) is considered a subset of electronic circuits.

In a first set of embodiments, a method includes retrieving from a computer-readable medium a first structural netlist data structure that indicates electronic components and connections therebetween for a first electronic circuit. The method also includes retrieving from the computer-readable medium a first placed and routed netlist data structure that indicates physical placement of the electronic components and physical routing of connections therebetween for the electronic components and the connections in the first structural netlist data structure. The method further includes retrieving from the computer-readable medium a second structural netlist data structure that indicates electronic components and connections therebetween for a different second electronic circuit. The method still further includes finding for each component in the second structural netlist data structure, using a processor, a matching component, if any, in the first structural netlist data structure based on type of component and inputs that are output from other matching components, without regard to a value of a programmable parameter of the component. Even further, the method includes generating, using a processor, a different second placed and routed netlist data structure that indicates physical placement of components and physical routing of connections for the second electronic circuit. This is done by: including, from the first placed and routed netlist data structure, all matching components and connections therebetween; updating the value of the programmable parameter in any matching component that has a different value of the programmable parameter in the second structural netlist data structure, and, deriving new placement of components and new routing of connections for components in the second structural netlist data structure that are not found matching components in the first structural netlist data structure. Yet further, the method includes causing the electronic circuit to be constructed according to the second placed and routed netlist data structure.

In some embodiments of the first set, the electronic components are field programmable gates, and causing the electronic circuit to be constructed includes using the processor to program automatically a field programmable gate array.

In some embodiments of the first set, the matching component is a field programmable gate, and the value of the programmable parameter is a look up table for the field programmable gate.

In some embodiments of the first set, the method yet even further includes retrieving from the computer-readable medium a first elaboration netlist data structure that indicates connected functions for the first electronic circuit. The first elaboration netlist data structure is used to generate the first structural netlist data structure. Yet even still further, the method includes determining automatically on the processor a functional invariant boundary in the first elaboration netlist data structure. Beyond that the method further includes retrieving from the computer-readable medium a second elaboration netlist data structure that indicates connected functions for the second electronic circuit, wherein the second elaboration netlist data structure is used to generate the second structural netlist data structure. And even further still, the method includes determining automatically on the processor a cone of components in the first elaboration netlist data structure based on the functional invariant boundary such that at least one component or connection in the cone of components is different in the second elaboration netlist data structure. In these embodiments, the step of finding the matching component is performed only for components in the cone of components, and the step of generating the second placed and routed netlist data structure further involves including, from the first placed and routed netlist data structure, all components and connections outside the cone of components affected by the change.

In other sets of embodiments, a computer-readable medium or an apparatus is configured to perform one or more steps of one or more of the above methods.

Still other aspects, features, and advantages are readily apparent from the following detailed description, simply by illustrating a number of particular embodiments and implementations, including the best mode contemplated for carrying out the invention. Other embodiments are also capable of other and different features and advantages, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

Embodiments are illustrated by way of example, and not by way of limitation, in the figures of the accompanying drawings in which like reference numerals refer to similar elements and in which:

FIG. 4A is a block diagram that illustrates an example placed component netlist during a place and route step of FIG. 1 for an electronic circuit, according to an embodiment;

FIG. 4B is a block diagram that illustrates an example placed and routed component netlist after a place and route step of FIG. 1 for an electronic circuit, according to an embodiment;

FIG. 6 is a flow chart that illustrates an example method to reuse previously placed and routed electronic components in a new electronic circuit, according to an embodiment;

DETAILED DESCRIPTION

Figure 1:
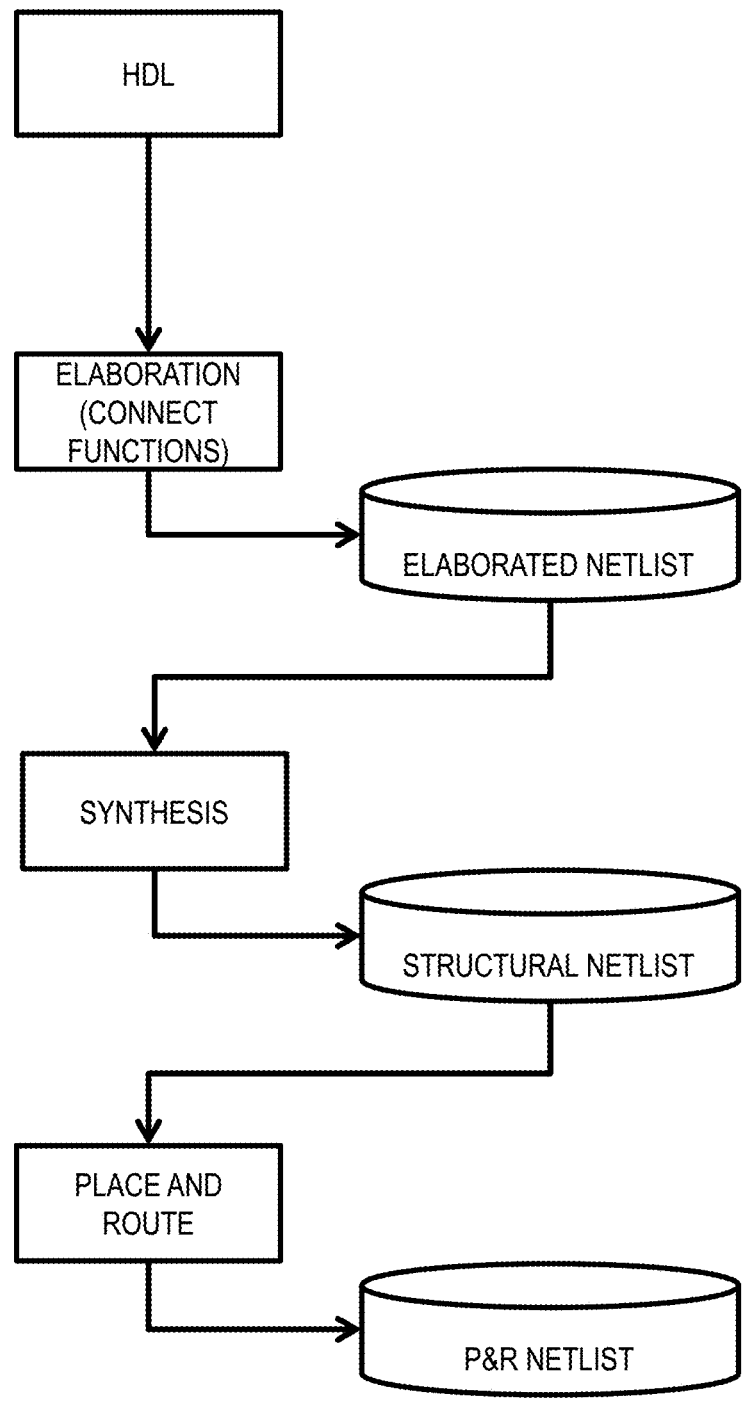
FIG. 1 is a block diagram that illustrates an example process for producing a netlist for constructing an electronic circuit, according to prior art.

A method and apparatus are described for re-use of at least a portion of synthesized circuits. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Notwithstanding that the numerical ranges and parameters setting forth the broad scope are approximations, the numerical values set forth in specific non-limiting examples are reported as precisely as possible. Any numerical value, however, inherently contains certain errors necessarily resulting from the standard deviation found in their respective testing measurements at the time of this writing. Furthermore, unless otherwise clear from the context, a numerical value presented herein has an implied precision given by the least significant digit. Thus, a value 1.1 implies a value from 1.05 to 1.15. The term "about" is used to indicate a broader range centered on the given value, and unless otherwise clear from the context implies a broader range around the least significant digit, such as "about 1.1" implies a range from 1.0 to 1.2. If the least significant digit is unclear, then the term "about" implies a factor of two, e.g., "about X" implies a value in the range from 0.5X to 2X, for example, about 100 implies a value in a range from 50 to 200. Moreover, all ranges disclosed herein are to be understood to encompass any and all sub-ranges subsumed therein. For example, a range of "less than 10" for a positive only parameter can include any and all sub-ranges between (and including) the minimum value of zero and the maximum value of 10, that is, any and all sub-ranges having a minimum value of equal to or greater than zero and a maximum value of equal to or less than 10, e.g., 1 to 4.

Some embodiments of the invention are described below in the context of programming and re-programming FPGA. However, the invention is not limited to this context. In other embodiments, other circuits are involved that include other circuit components such as memory chips, commercial processors, bias voltage sources, digital signal processor chips, graphic chips, accelerators, electronic boards, and electronic chips in general. In the case of ASICs, the matching component is a physical logic gate. The method is particularly useful for gates of same size and number of inputs/outputs, but could be applied for gates with different size and/or number of inputs/outputs.

1. STRUCTURAL OVERVIEW

Current electronic design workflows start with describing the circuit in either graphical or textual form. Electronic design automation (EDA) relies on hardware description languages (HDL) such as VHDL and Verilog to textually define the behavior and structure of the several internal components of the target devices to achieve the desired circuit. Through the design cycle, the several EDA programs will produce interim netlists that represent elements resulting from the user entered design in either behavioral or structural terms.

FIG. 1 is a block diagram that illustrates an example process for producing a netlist for constructing an electronic circuit, according to prior art. First, the circuit is described using a hardware description language (HDL) defining the components, instantiating the components, and specifying the interconnection between the components. Second, the elaboration software creates an elaborated netlist translating the HDL description to a data structure to be interpreted by the processor.

The system goes through a process called synthesis using synthesis software whereby the logic design and structural interconnection of the components found in the elaborated netlist is mapped to hardware components, and, in some embodiments optimized to find the most economical and efficient design and latest technologies. It will be appreciated that usually the aim of the synthesis software is to reduce propagation delay, power consumption, chip area, or a combination thereof by minimizing the number of components and interconnects. It will also be appreciated that, in some cases, the aim of minimizing propagation delay in the synthesis software may involve additional components and interconnects. The synthesis software generates a netlist called a structural netlist herein. A structural netlist indicates electronic components and connections therebetween. In various embodiments, a structural netlist is produced in any manner, including using a simplified synthesis process with or without optimization or adding components. The structural netlist is then passed to the place and route software where the system assigns physical components and locations in the target device to the structural components identified in the structural netlist. Typically elaboration and synthesis are done by the same software. In some such embodiments, it is possible to generate both an elaborated netlist data structure and a structural netlist data structure using the combined software.

Figure 2:
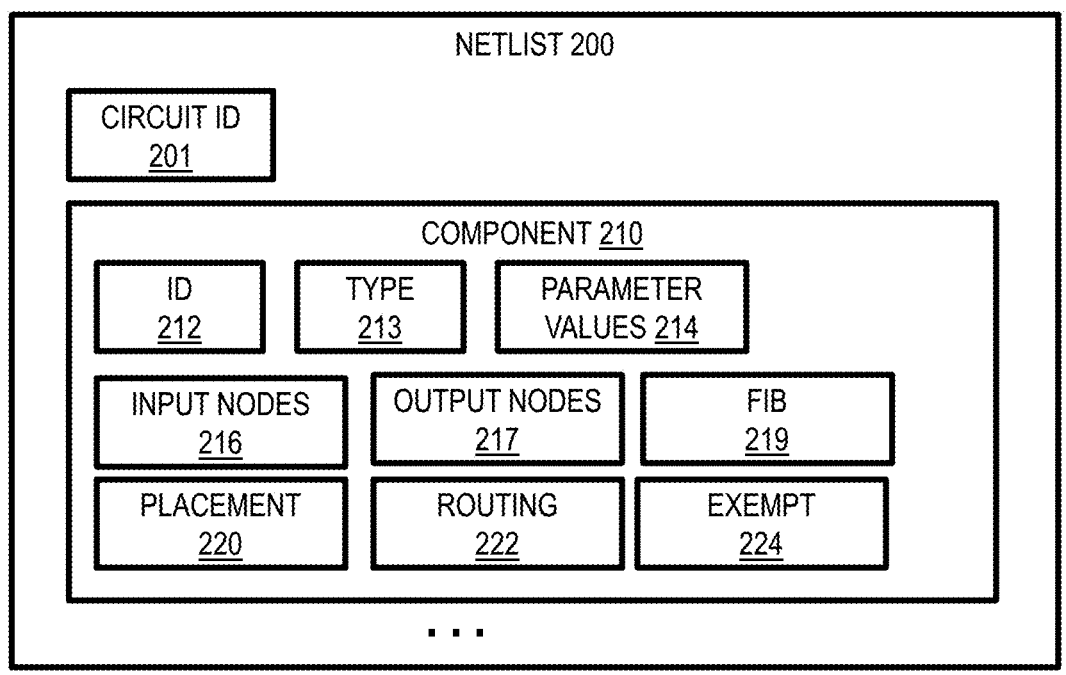
FIG. 2 is a block diagram that illustrates an example data structure for a reusable netlist, according to an embodiment.

FIG. 2 is a block diagram that illustrates an example data structure 200 for a reusable netlist, according to an embodiment. Although data structures and fields are depicted in FIG. 2 as integral blocks in a particular order for purposes of illustration, in other embodiments, one or more data structures or messages or fields, or portions thereof, are arranged in a different order, in the same or different number of data structures or databases in one or more hosts or messages, or are omitted, or one or more additional fields are included, or the data structures and messages are changed in some combination of ways. Any fields not used in a particular netlist can be filled with null values or omitted entirely. For example, placement and routing fields 220 and 222, respectively, are not used in an elaborated netlist or structural netlist, as those netlists are defined herein.

Continuing with FIG. 2, circuit ID field 201 holds data that indicates a unique identification for the specific circuit being described. It may also function to maintain version metadata and other identifiers necessary to distinguish from other similar or even identical designs. Component record 210 holds data that indicates and broadly encompasses all the definitional elements corresponding to a specific component within netlist 200. It will be appreciated that a netlist 200 may indicate a plurality of components and corresponding records 210—indicated by ellipsis—depending on the functions defined by the circuit design and limited only by the hardware specifications of the target device. Every instantiated component indicated in record 210 may include a unique ID field 212 and a type field 213. The type field 213 holds data that indicates to the synthesizing algorithm the type of characteristics that accompany the component of record 210. On the other hand, ID field 212 serves to differentiate component of record 210 from other but distinct components of the same or different type.

Each component record 210 also includes structural and behavioral elements such as parameter values indicated by data in field 214, one or more input nodes indicated by data in field 216, one or more output nodes indicated by data in field 217, and a functional invariant boundary indicated by data in field 219. It may be appreciated that the input nodes indicated in field 216 and output nodes indicated in field 217 may indicate physical inputs and outputs specific to discrete internal blocks of the device. As used herein, the terms "cell" and "gate" are used interchangeably to refer to logic elements, such as a FPGA gate programmed with a specific LUT. Moreover, as used herein, the terms "block" and "cones" refer to a set of at least one "cell" or "gate." However, the terms "block" and "cone" may not be used interchangeably. As used herein, a "cone" includes all the components found between a single output and all the inputs that determine the behavior of that output. As a non-limiting example, a cone may consist of all the components directly or indirectly connected to a single output when considering the design from the output inward. It may be appreciated that, according to an embodiment, a cone is not limited to inputs or outputs, instead a cone may define a subset of a circuit wherein the output and related inputs of the cone are nets or wires, which may or may not be inputs and outputs, that may or may not be shared with other cones, and that may or may not have been affected by a change between the original structural netlist and the revised structural netlist. On the other hand, as used herein, the term "block" is any set of one or more cells regardless of the number of inputs or outputs, or whether they are affected by a particular change between the original structural netlist and the revised structural netlist.

As an example, application specific integrated circuits (ASICs) and field-programmable gate arrays (FPGA) are composed of an array of identical multipurpose logic blocks that may be combined to achieve a user specific circuit. Many of the above-mentioned logic blocks have a set number of inputs and output that may then be interconnected to form larger more complex circuits. As used herein, the term "node" means any junction of one or more electrical connections.

In an embodiment, the behavior of the component indicated in field 210 is defined in part by parameter values indicated in field 214. In an embodiment, parameter values indicated in field 214 may be in the form of truth tables corresponding to the logic algorithm defined by the user in the initial circuit design using HDL or switch setting of some complicated chips. As an example, specific to FPGAs, parameter values 214 may take the form of look up tables that are loaded onto the memory elements of the FPGA logic blocks.

The functional invariant boundary indicated in field 219, if included, indicates whether the component indicated in record 210 is within a set of components that remain logically equivalent before and after the synthesis process. In an embodiment, the functional invariant boundary indicated in field 219, if included, indicates which set of components that remain logically equivalent before and after the synthesis process includes the component indicated in record 210. As used herein, a functional invariant boundary, is a net that remains the same after synthesis, as an example, global inputs and outputs of a target device are functional invariant boundaries because they will not vary after undergoing synthesis process. As used herein, the terms "net" or "wire" refer to a designation given to a path (also called a "logical wire") between two or more components of a circuit.

The physical location of components of the target device corresponding to the design component indicated in field 210 are specified by data in placement 220 field. The interconnections to physically connect components indicated in fields 210 to other upstream components indicated by input nodes field 216 can be specified by data in routing field 222. It is appreciated that fields 220 and 222 are blank or absent in netlists formed before the placement and routing steps, such as in a data structure for a synthesis netlist. Exempt field 224 can be used as a flag to determine whether in subsequent elaborations, synthesis, or placement and routing processes the component 210 needs to be elaborated, synthesized, or placed and routed again. A component indicated in record 210 is exempt if it need not be elaborated, synthesized or placed and routed again.

Figure 3A:
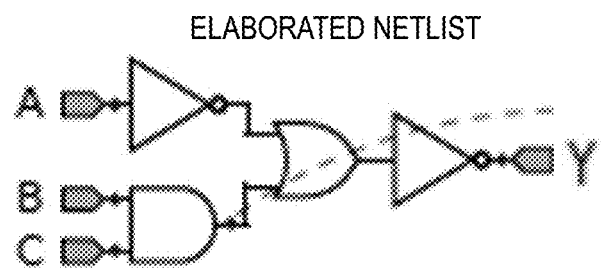
FIG. 3A is a block diagram that illustrates an example netlist after an elaboration step of FIG. 1, according to an embodiment.

FIG. 3A is a block diagram that illustrates example information in a netlist after an elaboration step of FIG. 1, according to an embodiment. The block diagram of FIG. 3A defines a three input-one output logic circuit composed of inverters, AND, and OR after the elaboration process of FIG. 1.

Figure 3B:
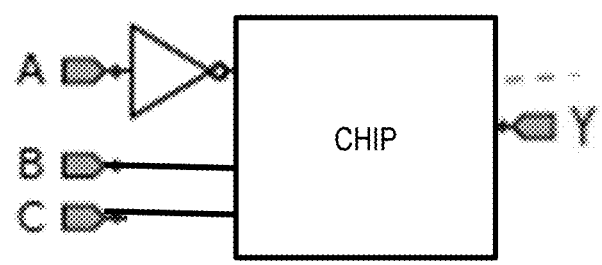
FIG. 3B is a block diagram that illustrates an example structural netlist after a synthesis step of FIG. 1 for an electric circuit, according to an embodiment.

FIG. 3B is a block diagram that illustrates example information in a structural netlist after a synthesis step of FIG. 1 for an electric circuit, according to an embodiment. The example structural netlist defining a three input-one output circuit wherein input A is connected to an inverter or NOT gate. The output of the NOT gate along with inputs B and C connected to a target device or chip that serves the same function as three components in FIG. 3A.

Figure 3C:
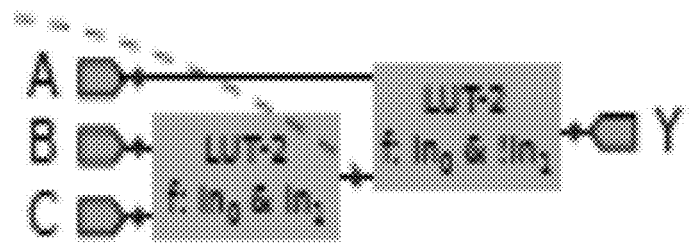
FIG. 3C is a block diagram that illustrates an example structural netlist after a synthesis step of FIG. 1 for field programmable gate array (FPGA) circuit, according to an embodiment.

FIG. 3C is a block diagram that illustrates example information in a structural netlist after a synthesis step of FIG. 1 for field programmable gate array (FPGA) circuit, according to an embodiment. The example structural netlist example resulting from the synthesis process defines a three input-one output circuit with two interconnected logic elements in the form of look up tables equivalent in function to the components in the elaboration netlist of FIG. 3A.

FIG. 4A is a block diagram that illustrates example information in a placed component netlist during a place and route step of FIG. 1 for an electronic circuit, according to an embodiment. In the place step components in records 210 from FIG. 2 are matched with physically available locations in the target device which are indicated by the data in field 220.

FIG. 4B is a block diagram that illustrates example information in a placed and routed component netlist after a place and route step of FIG. 1 for an electronic circuit, according to an embodiment. The routing step optimizes the interconnections between components indicated in records 210 from FIG. 2 and selects the available resources, such as connectors and power sources, in the target device to achieve physically the circuit defined by a synthesized netlist which are indicated by the data in field 222.

Figure 5A:
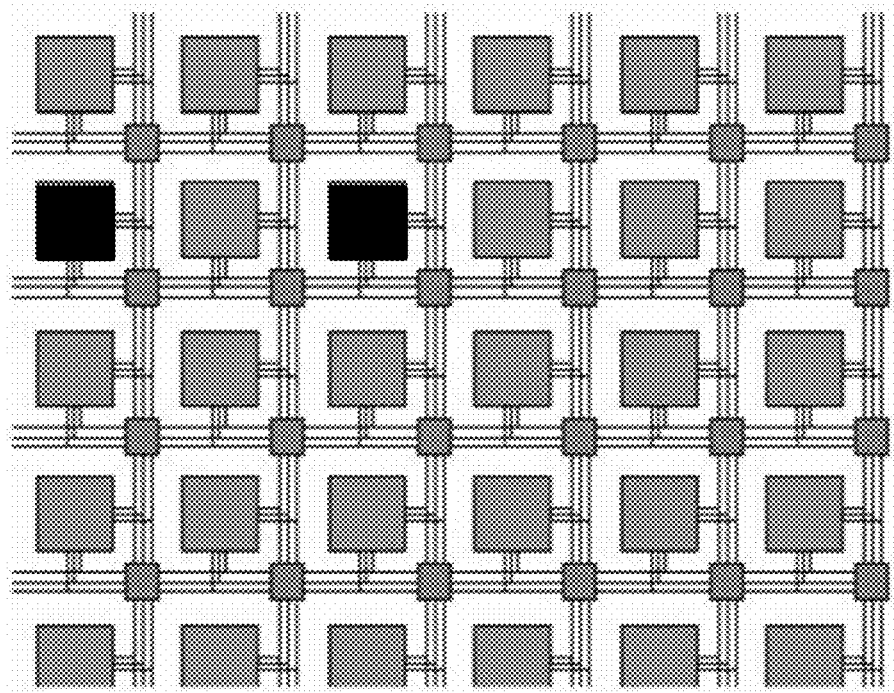
FIG. 5A is a block diagram that illustrates an example placed component netlist during a place and route step of FIG. 1 for a FPGA, according to an embodiment.

FIG. 5A is a block diagram that illustrates example information in a placed component netlist during a place and route step of FIG. 1 for a FPGA, according to an embodiment. The black outlined squares indicate the placement of FPGA which are indicated by the data in field 220. As a non-limiting example, a typical FPGA architecture includes a plurality of identical block containing different electronic elements, such as a look up table (LUT), a full adder, and flip-flops.

Figure 5B:
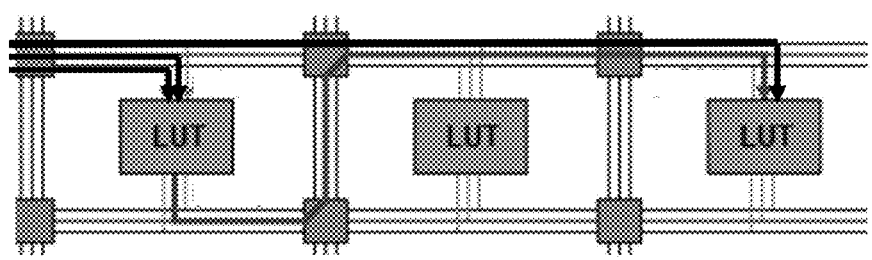
FIG. 5B is a block diagram that illustrates an example a placed and routed component netlist after a place and route step of FIG. 1 for a FPGA, according to an embodiment.

FIG. 5B is a block diagram that illustrates example information in a placed and routed component netlist after a place and route step of FIG. 1 for an FPGA, according to an embodiment. In a FPGA, LUTs are interconnected by using multiplexers and other combinational logic to busses, including data and address busses. The segmented arrows indicate the routing between FPGA which are indicated by the data in field 222.

2. METHOD OVERVIEW

FIG. 6 is a flow chart that illustrates an example method to reuse previously placed and routed electronic components in a new electronic circuit, according to an embodiment. Although steps are depicted in FIG. 6, and in subsequent flowchart FIG. 7, as integral steps in a particular order for purposes of illustration, in other embodiments, one or more steps, or portions thereof, are performed in a different order, or overlapping in time, in series or in parallel, or are omitted, or one or more additional steps are added, or the method is changed in some combination of ways.

In step 611, the system retrieves from a computer-readable medium an original or first structural netlist data structure, and a second structural netlist data structure corresponding to one cone. The first structural netlist data structure defines an original or first electronic circuit by describing its components and interconnections. The system also retrieves a first placed and routed netlist data structure corresponding to the first structural netlist data structure. The first placed and routed netlist indicates the physical location in the target device of the electronic components required to achieve the first electronic circuit, as well as physical elements that will interconnect the electronic components as defined by the first structural netlist data structure.

The revised or second structural netlist data structure defines a second electronic circuit by describing its components and interconnections. It will be appreciated that while the first and second electronic circuits may be similar in structure and behavior, such as the relationship between an original and revised design, it is not a requirement. Consequently, while the respective first and second structural netlist data structure may be similar, the system will work on any first and second structural netlist data structures.

In steps 621, 623, and 631 the system analyzes each component from the second structural netlist data structure and finds a matching component from the first structural netlist data structure. In an embodiment, the system, using the processor, matches both components by using data from one or more of ID field 212, type field 213, input nodes field 216, output nodes field 217, FIB field 219 in the synthesized netlists of the first and second circuits. Unlike previous approaches in the prior art, no regard is paid to the values of the programmable parameter in determining a match, e.g., the data in field 214 is not considered in determining a matching component. For example, the values of a LUT are not considered in determining a matching gate. It may be noted that, according to an embodiment, the values of the programmable parameter may be equivalent to the logic implemented by the component.

If a match is found in step 631, then the system uses the placement and routing from the original (or first) placing and routing netlist by marking the component as exempt from placing and routing by setting the exempt 224 flag to one value (e.g., 1). Then, any characteristics from the component in the second circuit that need to be updated, such as parameter values 214 are uploaded in step 634. If no match is found in step 631, then the component from the second structural netlist data structure is considered a new component with no matching component in the first structural netlist data structure and is marked as non-exempt from placing and routing by setting the exempt 214 flag with a different value (e.g., 0). The new, non-matching component will thus be placed and routed in later step 645, described below.

Returning to step 621, if no other new components 210 are found in the revised or second structural netlist data structure, then the system checks, in step 641, whether there are any other components 210 remaining in the original or first structural netlist data structure and removes them in step 643. It will be appreciated that, in some embodiments, steps 641 and 643 are optional, because if there are no new components in the revised list, then there is no need to remove placed and routed items from the original placed and routed netlist. Instead, a new second placed and routed netlist is generated that does not have any components from the original netlist that are not in the revised netlist; and, thus, there is nothing to remove. In such embodiments, the method proceeds directly from the no (N) arm of step 621 directly to step 645. With regards to step 645, all the components 210 that were marked as non-exempt are then sent to be placed and routed. In some embodiments, step 645 includes determining and sending the location of the space available in the target device for the placement and routing of the non-exempt components and connections. The result of step 645 is a second placed and routed netlist data structure indicating the physical placement of components and physical routing of connections for the second electronic circuit. The second placed and routed netlist data structure includes all matching component and connections between the first structural netlist data structure and the second structural netlist data structure, and new placement and routing for components in the second structural netlist data structure that are not found in the first structural netlist data structure.

Figure 7:
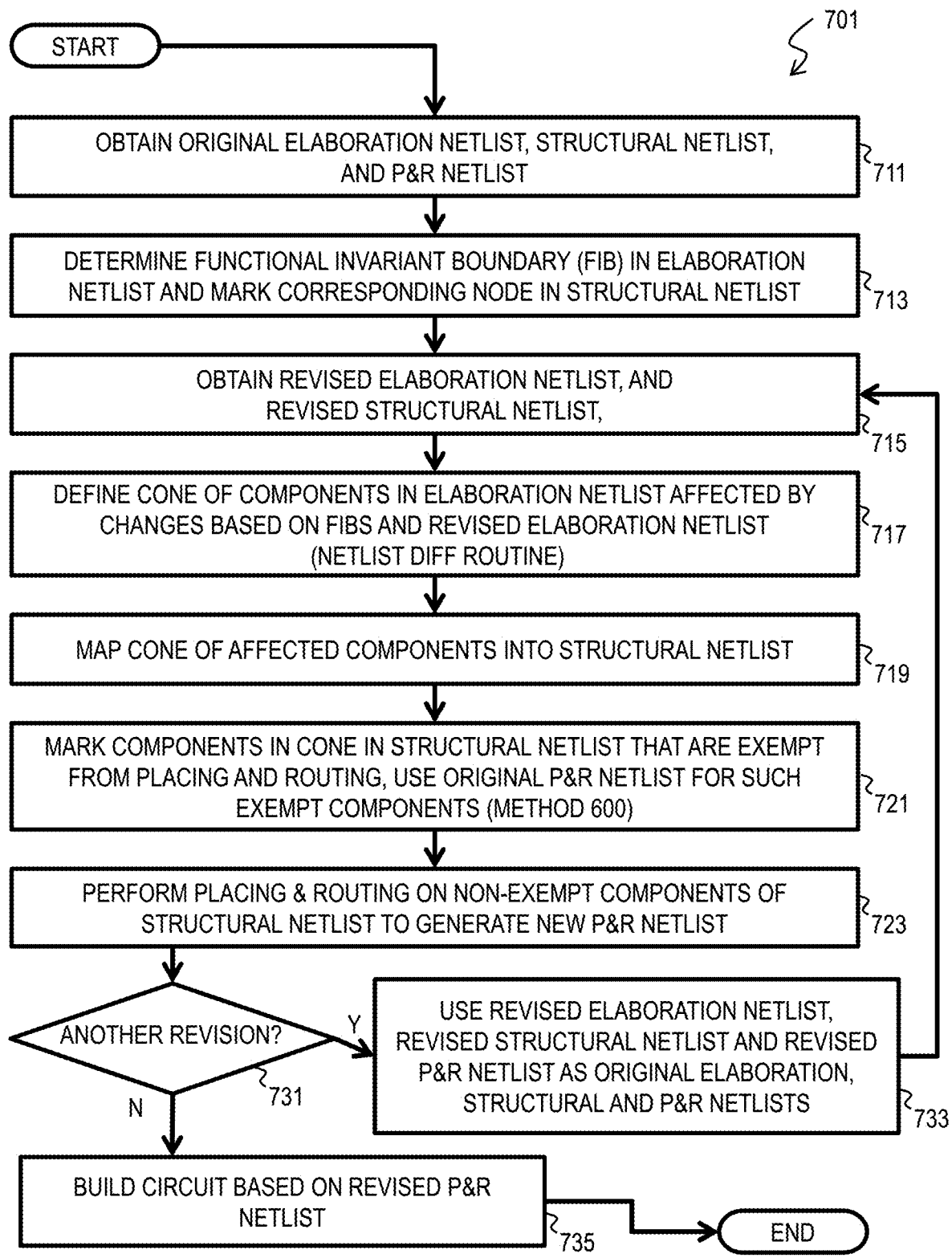
FIG. 7 is a flow chart that illustrates an example method to use the method of FIG. 6, such as when making minor revisions to a complex circuit, according to an embodiment.

FIG. 7 is a flow chart that illustrates an example method to use the method of FIG. 6, such as when making minor revisions to a complex circuit, according to an embodiment. In step 711, the system retrieves from memory an original or first elaboration netlist data structure, an original or first structural netlist data structure, and an original or first place and route netlist data structure. In an embodiment, the first elaboration describes the first electronic circuit in terms of connected functions. The first structural netlist data structure is obtained after the synthesis process from FIG. 1 is performed on the first elaborated netlist data structure. Equally, the first place and route netlist data structure are obtained after the place and route process from FIG. 1.

In step 713, the first elaboration netlist is analyzed to determine a functional invariant boundary (FIB). In an embodiment, a functional invariant boundary is determined by selecting a node of the first electronic circuit and analyzing the first structural netlist data structure to find nets connected to that node with unchanged functionality after going through synthesis. As a non-limiting example, a node can be a global input or output, or it can be an internal connection within the target device. Any method known in the art may be used.

In step 715, the system retrieves the revised or second elaboration netlist data structure that indicates connected functions for the second electronic circuit, it also retrieves the corresponding second structural netlist data structure. In step 717, the system uses the functional invariant boundary determined in step 713, to identify a cone of components from the first elaboration netlist data structure where at least one element—in a non-limiting example a component or an interconnection—is different in the second elaboration netlist data structure.

Once a cone of affected components is identified in step 717, the system maps the cone of affected components into a second structural netlist data structure. In step 721, the components in the cone that are exempt from placing and routing are marked as such, e.g., using the method of FIG. 6. The system uses the original or first place and route netlist data structure to identify the exempt components according to the non-limiting embodiment shown in FIG. 6. In step 723, any non-exempt components are then placed and routed to generate a second place and route netlist data structure.

In an embodiment, the method illustrated in FIG. 7 can process more than one subsequent circuit. In step 731, the system determines if another revision has been made. If so, the second elaborated netlist data structure, the second structural data structure, and the second place and route netlist data structure take the place of the first or original elaborated structural, and place and route netlist data structures, respectively; the process is then repeated from step 715. If not, then, in step 735, the electronic circuit is instantiated in the target device.

3. EXAMPLE EMBODIMENTS

According to an example embodiment, the method of FIG. 7 and FIG. 6 are applied to reusing a FPGA design during development including one or more minor revisions.

Figure 8A:
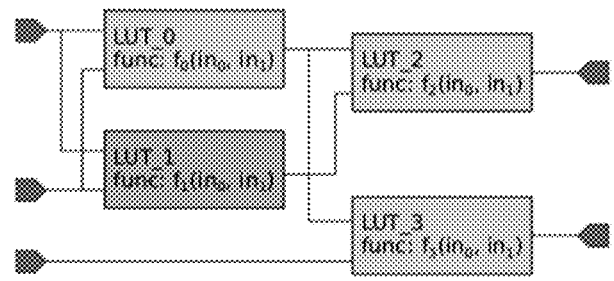
FIG. 8A is a block diagram that illustrates an example structural netlist after a synthesis step of FIG. 1, according to an embodiment.

FIG. 8A is a block diagram that illustrates an example original or first structural netlist after a synthesis step of FIG. 1, according to an embodiment. This information can be included in a data structure such as depicted in FIG. 2. The example structural netlist describes a three input-two output circuit with four interconnected memory elements or LUTs each containing a separate function $f_0$ thru $f_3$. It will be appreciated by those skilled in the art that the number of inputs, outputs, and components is irrelevant, and the system can be scaled to any number of inputs. In this example, the identification in step 717 of a cone where a change is made may be achieved as described in more detail below with reference to the pseudo-code shown in Table 2, below.

Figure 8B:
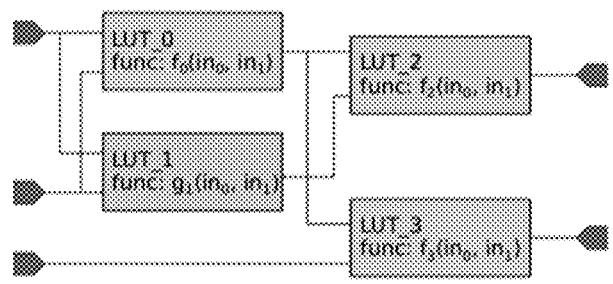
FIG. 8B is a block diagram that illustrates an example structural netlist after a synthesis step of FIG. 1 with an updated LUT, according to an embodiment.

FIG. 8B is a block diagram that illustrates an example structural netlist after a synthesis step of FIG. 1 with an updated LUT, according to an embodiment. In a prior art workflow, the original or first structural netlist data structure would be passed to the place and route process to generate an original or first place and route netlist data structure. When a design change to the electronic circuit is implemented in the form of a second electronic circuit illustrated by the change in the function contained within LUT_1 from $f_1$ to $g_1$, the prior art would run the place and route process indiscriminately over the entire revised or second structural netlist data structure resulting in a second place and route netlist data structure. In an alternative prior art workflow, the system would instead selectively run the place and route process over LUT_1 only.

In an embodiment, a change in the function of an LUT would not be followed by the place and route process. Instead, the system would find in step 633 an existing LUT that has already been placed and routed with functionality and interconnections matching the requirements of the updated function $g_1$. The system then would only have to update the contents of the LUT in step 634 and avoid having to perform the place and route process again.

Figure 8C:
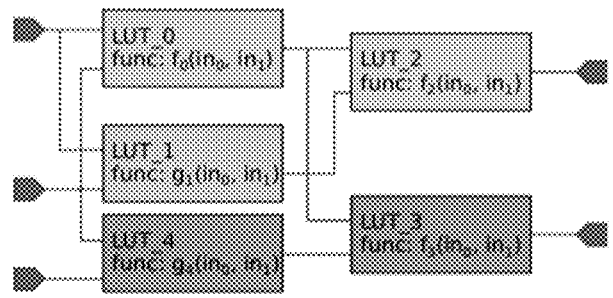
FIG. 8C is a block diagram that illustrates an example structural netlist after a synthesis step of FIG. 1 with an updated LUT and an additional LUT, according to an embodiment.

FIG. 8C is a block diagram that illustrates an example structural netlist after a synthesis step of FIG. 1 with an updated LUT and an additional LUT, according to an embodiment. It will be noted that an additional LUT with no matching existing LUT is found in step 635 and will have to be placed and routed in step 645 following the regular process, as is the case of LUT_4. Additionally, any LUTs downstream from the additional LUT are also found in step 635 and will have to be placed and routed as well in step 645, as is the case with LUT_3. On the other hand, in LUT_1 only the function changed and no nets—i.e. no inputs or outputs—were changed, therefore there is a match found in step 631, and the function of LUT_1 can be updated in step 634 without having to go through the process of placement and routing again. Thus, the unhatched LUTs have to be placed and routed; but, the hatched LUTs need not be placed and routed.

In an embodiment, the process of matching an existing original or first LUT with a revised or second LUT can further be streamlined by comparing the LUTs with respect to structural elements only. In an example, if the second LUT only has one input, then only original LUTs with one input are considered. In another embodiment, if the inputs or outputs to the LUT are global and therefore fixed, then only LUTs with fixed inputs or outputs, respectively, are considered. After the process has been performed any original or first LUTs that are no longer used in the new design are removed from the netlists, or simply not added to the new placed and routed netlist and made available to the system before placement and routing of the remaining LUTs, thereby allowing the system to be more efficient in allocating resources.

3.1. Structural Matching of Netlists

Simulations were performed to show the advantage of applying the methods of FIG. 6 and FIG. 7. This process is illustrated in FIGS. 8A thru 8C. For the sake of simplicity and without loss of generality, LUTs with two input bits are considered, however the method (similar to the method 701 shown in FIG. 7) is trivially extended to any number of input bits.

It will be appreciated that in the context of the prior art workflow, introducing changes into an electronic circuit such as those in FIGS. 8A and 8B would prompt the system to place the additional elements in locations that yielded more ideal placement. In the case of the above-mentioned embodiment, it could be argued that since LUT_3 will be most likely placed in a different position, this could affect the ideal placement for LUT_1, thus it should also be replaced to achieve an ideal placement. However, it will be appreciated that in the above mentioned embodiment it is not needed to reach "close-to ideal" results and that the impact on the Quality of Results (QoR) of not considering those LUTS for re-placement and re-routing have low QoR penalty. Throughout this specification and the claims, unless the context requires otherwise, the phrase Quality of Results, and its acronym QoR will be understood to mean the quality metrics of a circuit, which may or may not include performance (usually represented by the maximum frequency at which a circuit can run), power, and area.

Since the above mentioned embodiment is a structural pass over both the original or first netlist and the modified or second netlist, it can also be performed in linear time with the size of block considered. This method is explained in Table 1, similar to method 601. In the first loop (lines 5 to 17), candidate equivalent LUTs are found between the original or first structural netlist and the revised or second structural netlist, similar to step 623 in FIG. 6. Since global outputs are fixed and each net has a single driver from a single LUT, there is only one possible candidate LUT for the output nets. Then, for an arbitrary LUT throughout the first or second structural netlist, we only consider the LUTs from the same input, that is, if the functionality is still the same, but if the inputs are in a different order, the LUT will be marked as not equivalent. Then, in the second loop (lines 18 to 24), we verify that all the LUTs that were still not marked as not equivalent, have the same set (and order of inputs), otherwise the LUT is marked as not exempt in the exempt field 224 for placement and routing, similar to steps 631 and 635 in FIG. 6.

Analogous to step 631, after a match is found, the LUT is marked as exempt from routing and matching LUTs have its functionality updated, similar to step 633 and 634. Any additional LUT is placed and routed using the conventional place and route tools available in the flow. Similar to step 641 and 643, any LUT that is no longer used in the new implementation of the circuit should be removed and made available before placement and routing of remaining LUTs, since it will open up space for new LUTs to be placed, which can improve QoR.

TABLE 1

Pseudo code to compare two netlists according to an embodiment.

```
1.   procedure SMATCH(new_gates, old_gates)
2.       candidates←map( )
3.       matches←Ø
4.       no_equiv←Ø
5.       for all BFS from outputs(new_gates) do
6.           current←BFS.next
7.           if is-output(current) then
8.               can←same_output(old_gates)
9.           else
10.              can←fan-in(candidates[fan-out(current)])
11.          end if
12.          if candidates[current] != can then
13.              no_equiv += current
14.          else
15.              candidates[current]←can;
16.          end if
17.      end for //End BFS
18.      for all lut,candidate←candidates do
19.          if fan-in(candidate) = candidates[fan-in(lut)] then
20.              matches += lut
21.          else
22.              no_equiv += lut
23.          end if
24.      end for
25.      return no_equiv, matches
26.  end procedure
```

3.2. Handling Retiming and Extra Registers

Throughout this specification and the claims, unless the context requires otherwise, the word retiming, will be understood to mean the operation of moving logic across registers to improve timing closure. Retiming can be applied to any circuit without changing the sequential behavior of it. Adding registers to a design is also an alternative to timing closure. They can be manually inserted, inserted through the assist of automated tools or even in latency insensitive designs. Regardless of the technique used, here those changes are handled in an efficient manner.

Figure 9A:
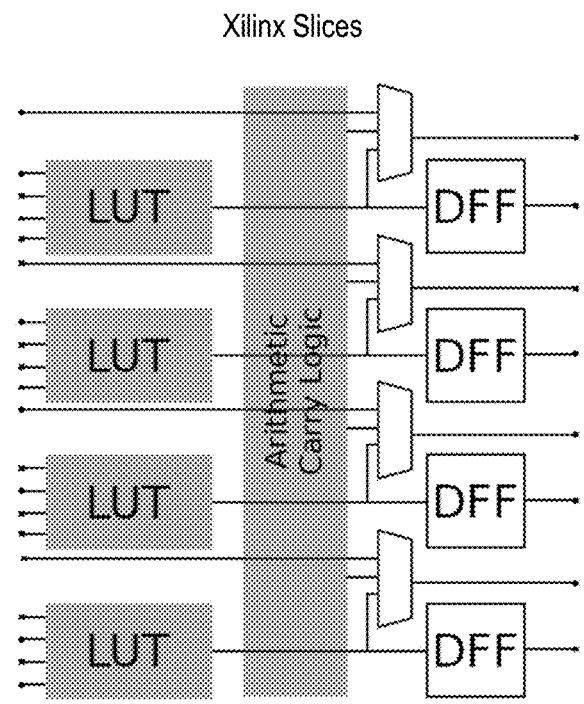
FIG. 9A is a block diagram that illustrates an example FPGA where the LUTs are organized in slices, similar to Xilinx FPGAs.
Figure 9B:
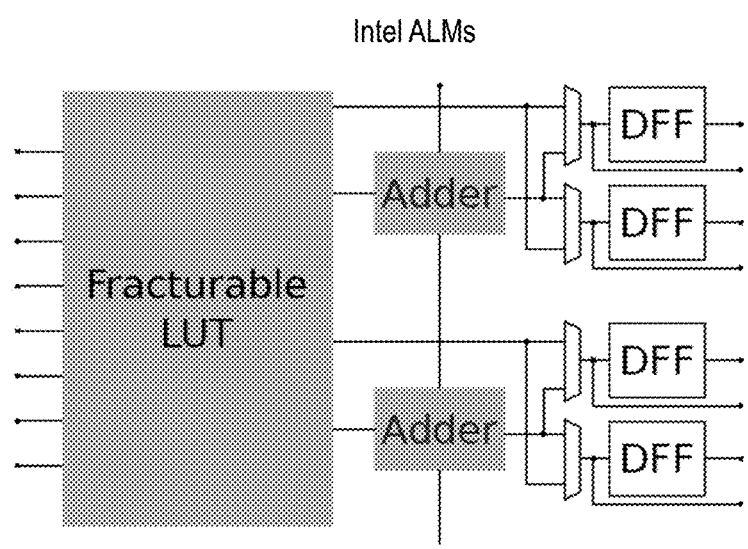
FIG. 9B is a block diagram that illustrates an example FPGA where the LUTs are organized in adaptive logic modules (ALM), similar to Intel FPGAs.

It may be appreciated that as a non-limiting example, in FPGAs, adding, removing or moving flip-flops is a simple operation due to the FPGA architecture and organization. FIG. 9A is a block diagram that illustrates an example FPGA where the LUTs are organized in slices, similar to Xilinx FPGAs. FIG. 9B is a block diagram that illustrates an example FPGA where the LUTs are organized in adaptive logic modules (ALM), similar to Intel FPGAs. The overall architecture of a block varies by vendor. In Xilinx slices, there are 4 LUTs, with hardened arithmetic logic, 4 flip-flops, and by-pass logic. The 4 LUTs can have different number of inputs in different slices (from 2 to 6). They can be used independently or combined into larger logic blocks (of up to 6 inputs). In any configuration, there is at least one flip-flop per LUT.

As illustrated in FIG. 9B, in Intel FPGAs, each ALM contain an 8-input fracturable LUT, two full adders and four flip-flops. The fracturable LUT can be split into pairs of LUTs of up to 6-input. Combinations that total less than 8 inputs can have independent inputs, however, combinations that exceed the amount of available inputs advantageously use shared inputs. As an example, to implement two 5-input LUTs, two inputs need to be shared. In the Intel FPGA case, the number of flip-flops is also enough to handle any configuration, there is at least one flip-flop per LUT and per adder. Also, in the case of both vendors, regardless of the flip-flop usage in each LUT, the routing resources from the output of the slice are the same.

Thus, the method 701 according to an embodiment can simply add or remove flip-flops at the output of each LUT to increase the amount of matching LUTs between two structural netlists. Simply put, during the matching process, registers can be ignored, and a final pass over flops only can add or remove flip-flops to match the revised or second structural netlist. It may be appreciated that in FPGA architectures where fewer flip-flops exist, the simple approach of deciding where to use flip-flops after applying the method 701 according to an embodiment is not viable anymore. In those cases, it would be possible to adapt the method 701 according to an embodiment to: while doing matching, verify whether a flip-flop is needed for each LUT and if so, verify if one exists, in this case, no extra work is needed. In case a flip-flop is needed, and one is not available, the LUT is marked as not exempt for placement and routing using the exempt field 224.

3.3. Partitioning the Design Size

It may be appreciated that the method 701 according to an embodiment to find the matching LUTs could be applied to an entire revised design, but that would be inefficient in some embodiments because it would involve the synthesis of the whole design, even for a small change. Moreover, synthesizing the whole design, even after a small change, may yield important differences in the final netlist. Therefore, in some embodiments, the size of the netlist that needs to be considered is limited by leveraging incremental synthesis.

As used herein, an incremental synthesis flow is defined as a flow that leverages existing synthesis results to generate a new set of results. Among these flows, there are multiple specific objectives that can be addressed: improving synthesis quality, fixing issues found late in the design cycle, and rapidly explore solutions to fix bugs and/or optimize the electronic circuit in early phases of the design cycle. The first type usually exists in most synthesis, placement and routing tools where multiple iterations are done over the design to improve QoR after more detailed information exists (such as leveraging physical information to improve synthesis or using routing information to get better estimates for wire delay during placement). The second type of flow is usually referred to as Engineering Change Orders, or ECOs. ECOs are intended to make changes to the functional description of the design at the HDL level, but in general target minimal perturbation to a mostly frozen design, when changes are very costly. Tools for ECO flows exist, but in general take several minutes to hours to run, and thus differ from the third type of incremental flow whose goal is to impact the early phases of the development cycle and thus want to be faster and can touch a larger portion of the design. This work can be classified into the last type.

The overall objective of an incremental tool can be defined as: generate an implementation (Impl1) for a design specification (Spec1), second netlist of FIG. 6, by leveraging an existing implementation (Impl0) for a prior specification (Spec0), the first netlist of FIG. 6. In the embodiment illustrated here, an implementation is a fully placed and routed netlist for a target FPGA. According to an embodiment, an implementation is also an elaborated netlist.

The main reason to rely on a netlist after elaboration is to not need to deal with high-level language constructs and to be able to be language agnostic, e.g., to be able to support a large variety of languages, including high-level synthesis, regardless of how they are converted to a netlist. Elaboration is also "well-behaved," meaning that it produces identical logic structures for identical regions of HDL. This is not the case for synthesis where minimal perturbations in the HDL can have large impacts on the netlist after synthesis.

3.3.1. Definition of Incremental Blocks and Setup Phase.

The definition of the blocks used for incremental synthesis have a major impact on the results. A good choice of blocks should allow for inter-module optimizations, yield small blocks so that the synthesis time is reduced considerably, and allow for fast replacement of the modified block. The last requirement is partially obsolete in the flow of the illustrated embodiment, since a more complex replacement method is used instead of just plugging and unplugging blocks. However, the choice of cones defined by functionally-invariant boundaries (FIBs) allow both inter-module optimization and yields small blocks and therefore is the choice implemented in the illustrated embodiment.

Functional invariant regions (regions whose functionality does not change during synthesis) have been used in previous approaches as the block of choice for incremental synthesis since they provide a limit for the impact on QoR that is observed for arbitrarily defined blocks. Those regions have also been shown to be small (around a few thousand blocks), which allow for a fast iteration during the incremental steps.

Another option would be to use incremental synthesis tools from FPGA vendors. However, incremental option in Xilinx tools only focus on placement and routing. The Rapid Recompile flow from Intel Quartus could be used, however, Quartus also limits how much can be done through the TCL (tool command language) command interface, and thus such an approach would require integration at the source code level for which access is often not available.

A net in the design is considered a Functional Invariant Boundary (FIB) if its functionality has not been changed during synthesis. By definition, global input and output pins are FIBs. From inputs and/or outputs, and traversing inwards into the design, it is possible to find internal nets with unchanged functionality. FIG. 3A and FIG. 3C illustrate an example where synthesis changes from the implementation of f=!(!a+bc) in FIG. 3A. Note that the symbol !a indicates NOT a so that if a=0 (e.g., FALSE) then !a=1 (e.g., TRUE), and the symbol "+" indicates the logical OR operator. In FIG. 3C the same circuit function is illustrated using a couple LUTs with two inputs. In this example, there are two Invariant Cones: $fib_1$=bc and $fib_2$=!a·!$fib_1$. Internal nodes in $fib_2$ presented changed logic and thus are not FIBs. In this simple example, each invariant boundary ended up with a single LUT, but this is usually not the case. Optimizations that use "don't care" information are functional changes and thus are not FIBs. As used herein, the term "don't care" refers to the value of a variable which has no impact on the result of a logic function. In other words, that a logic function is not sensitive to the value of a specific variable.

It will be appreciated that determining the above referenced points is a complex task that takes considerable time. However, the fact that a single setup pass is used over multiple incremental steps allow for longer runtime in the setup phase. Since the structure of the netlist changes over the course of synthesis, finding functionally equivalent regions require formally proving that a given region in the elaborated netlist is equivalent to a candidate region in the structural netlist. This is achieved by using satisfiability (SAT) solvers. As used herein, SAT solvers determine whether for a given Boolean formula there is a set of variables in the form of true or false values such that the formula equates to true. SAT solvers are widely used to determine if two Boolean formulas are logically equivalent. To limit the search space, an embodiment of the method 701 matches net names and uses them as candidate equivalents. If a net doesn't match, it is not marked as equivalent. Retiming is considered by counting the number of registers for each of the inputs in before running the SAT solver.

The setup phase keeps track of which gates belong to each cone and to how many cones each gate belongs. This is because gates that are shared across cones can only be replaced if all the cones that contain the gate are affected by the change, otherwise, an extra gate is inserted in some embodiments. The result of the setup phase is the original elaboration, structural, and placement and routing netlists illustrated in step 711.

3.3.2. Finding Specification Differences Before Re-Synthesis.

The setup phase is slow but only done once after an initial synthesis. During the development phase, the designer introduces changes to the code and only the incremental phase is then performed. Thus, it is advantageous for the incremental phase to be fast.

After a change to the code is made, it is advantageous to find which invariant regions were affected and thus should be re-synthesized. It is not beneficial to re-synthesize the whole design to reduce the number of gates that method 701 needs to cover, according to an embodiment. The netlist duff sub-step shown in Table 2, —an embodiment of step 717 described above, finds which blocks of the circuit have changed. It may be appreciated that a single code change can affect more than one cone, since cones are overlapping by definition. The original (first) and revised (second) netlist are traversed, starting by each invariant boundary and propagating backwards, until a FIB is found, if a difference is found, then the cone is marked different. This comparison does not capture changes that do not affect logic, as an example, a double negation would be flagged as a difference. Functionally comparing the cones would involve SAT solvers, which would be too slow to be desirable for the incremental step. On the other hand, adding a few extra cells will not impact synthesis time so much. After netlist cliff, the collection of gates to be synthesized is known.

TABLE 2

Pseudo code to find a cone in a second circuit with a difference from a first circuit.

```
1.  procedure DIFF(Netlist original, Netlist revised)
2.      diff_cone ← Ø
3.      same ← same_operation(original.op,revised.op)
4.      for idx get s 0; idx < revised.fanin.size; idx++ do
5.          if ! is_fib(fanin(revised,idx)) then
6.              diff_cone.append(fanin(revisedidx))
7.              same &= & diff(fanin(original,idx), fanin(revised,idx))
8.          end if
```

TABLE 2-continued

Pseudo code to find a cone in a second circuit
with a difference from a first circuit.

9.  end for
10. return [same, diff_cone]
11. end procedure

After netlist diff, gates belonging to revised cones are synthesized outside of the context of the design. This is similar to a prior art synthesis pass, with FIBs promoted to inputs and outputs to avoid optimization from removing them, and input and output delays, input driving cells and output loads are set to match the values in the original design, so those are taken into account as boundary conditions during synthesis. Timing constraints are also set to match the original design. Then, according to an embodiment, the original implementation of the design are fed to the SMatch step.

3.4. Putting it Together

Figure 10:
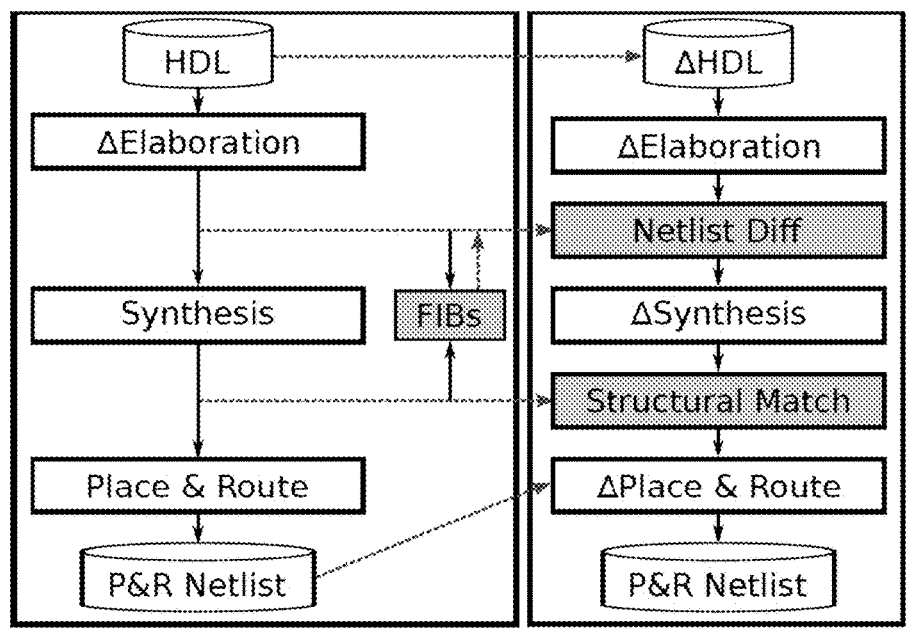
FIG. 10 is a flow chart that illustrates an example method to reuse previously placed and routed electronic components in a new electronic circuit when making revisions to a complex circuit, according to an embodiment.

FIG. 10 is a flow chart that illustrates an example method 701 according to an embodiment to reuse previously placed and routed electronic components in a new electronic circuit when revising an original electronic circuit, according to an embodiment. The invariant regions are found during a setup step, depicted in the left box of the diagram, which is run once after the initial synthesis. The FIBs are reused across multiple incremental steps; and, the setup step can be recalculated, ideally when no more changes are being introduced into the code. When changes are being performed, the incremental step is used, indicated on the right box of the diagram. The incremental step includes three substeps: Netlistdiff, synth, SMatch, which are embodiments of steps 717, 719 and 721, respectively. Netlistdiff compares the elaborated netlist from the original code (first netlist) with the elaborated netlist of the modified cone (second netlist), keeping track of which cones inside FIBs were changed. Then, using synth substep, these changed cones are synthesized, with aggressive optimization goals.

Finally, during SMatch, the newly synthesized netlist is structurally compared against the equivalent region of the original synthesized netlist. Matching LUTs have their logic updated or use placement and routing from the first placed and routed netlist, or both; while unmatched LUTs are removed, replaced with newly synthesized gates with their new LUTs, that are then placed and routed. Each of Netlistdiff and SMatch is a simple pass over the graph, with simple comparisons across cells in each; and, therefore are linear with respect to the netlist size. The steps represented by the black outlined boxes representing Netlist Diff, FIBs and Structural Match are new over the prior art.

3.5. Evaluation Setup

The method 701 was implemented for FPGA, according to an embodiment, in C++14, compiled with CLANG 5.0.0. The baseline synthesis flow is YOSYS version 0.7+312, a tool based on ABC, targeting Xilinx FPGAs. Placement and Routing were done using Xilinx Vivado 2017.2, QoR results are reported after routing.

QoR was compared with full synthesis for each change. For the structural updates, the TCL interface of Vivado was used, the overhead of using the TCL interface was estimated to guarantee that it was acceptable. For incremental updates in placement and routing, the TCL interface was set-up to make sure only the relevant cells were placed and routed. The runtime of the method 701 according to an embodiment was compared with LiveSynth and Vivado incremental placement and routing. The experiments were run on 2 Intel® Xeon® E5-2689 CPUs at 2.60 GHz, with 64 GB of DDR3 memory, Arch Linux 4.3.3-3 server.

These experiments used Anubis, a benchmark suite especially crafted for incremental synthesis that includes both RTL code for five designs (DLX, ALPHA, FPU, MOR1KX, OR1200) and code changes from real changes done to the code during its development cycle. Each benchmark includes around 20 to 30 code changes, divided into three categories: NoChange, Local, Global. NoChange are code changes that do not affect the logic (renames, double inversions, so forth). Local are code changes that affect a single module; and, Global are code changes that affect either multiple modules or modules that are instantiated multiple times. As used herein, the term "module" refers to parts of a target device that implement a specific function. As non-limiting examples "module" may refer to a processor core that contains instances of other modules, for example, an adder. Modules may include inputs, outputs, gates and nets. In an embodiment, cones and blocks may have cells and gates that belong to different modules.

3.6. Performance Evaluation

The performance evaluation begins by looking at the runtime of the method 701 according to the illustrated embodiment, considering synthesis, placement, and routing, over a full synthesis flow. It is compared against the runtime observed by LiveSynth and Vivado incremental synthesis. To better understand where the speedups for the method 701 according to an embodiment originate, the runtime of changing the functionality of a few hundred LUTs was examined, changing their placement, and changing their routing, which are the main tradeoffs involved when performing the method 701 according to the illustrated embodiment. Then, QoR degradation was examined; and the overhead of setup time is discussed.

3.6.1. Overall Results

Figure 11:
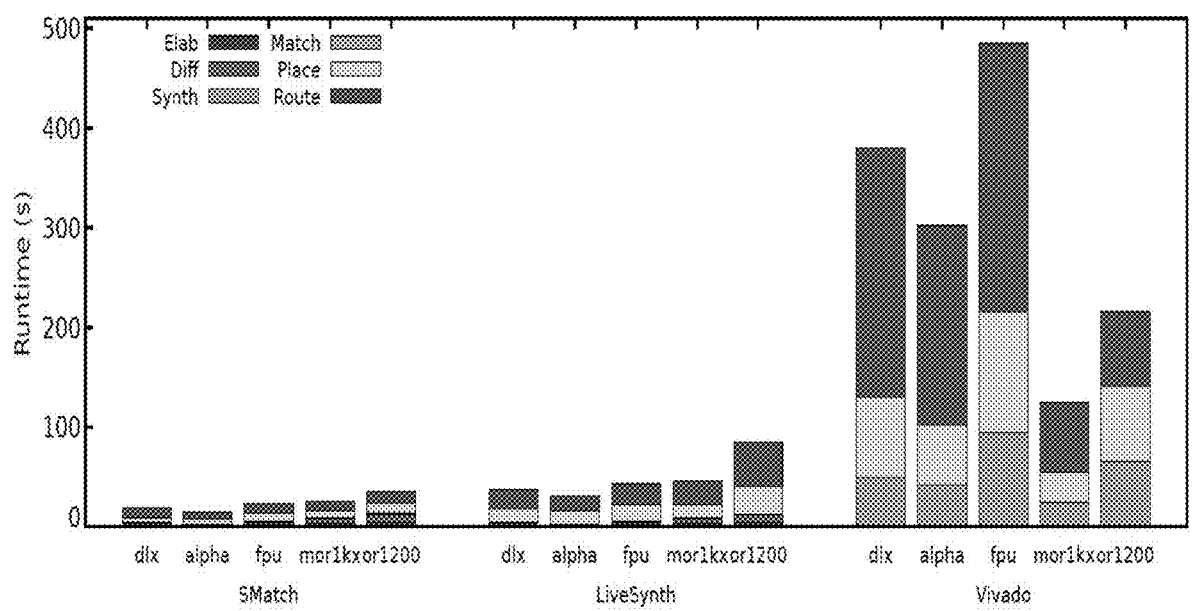
FIG. 11 is a plot that illustrates the runtime for each flow, for each benchmark in the Anubis suite, averaged across all changes and broke down by step in the flow, according to an embodiment.

FIG. 11 is a plot that illustrates the runtime for each flow, for each benchmark in the Anubis suite, averaged across all changes and broken down by step in the flow, according to an embodiment. Overall, the method 701, according to the illustrated embodiment, (denoted as SMatch in FIG. 11) has a runtime of under 30 seconds (s) for synthesis, placement and routing, for most changes in the Anubis benchmark suite, with an average of around 21 s. This is around 1.6 to 2 times faster than LiveSynth on average, and 5 to 21 times faster than the incremental mode of Vivado.

Most of the synthesis routine in SMatch, according to an embodiment, is the same as LiveSynth, however, the method has a more elaborated merge step—the Structural Matching algorithm, an embodiment of step 717. This adds to the synthesis time; however, the method has the advantage of reducing placement and routing even further. Since placement and routing are both slower than synthesis, SMatch ends up being faster than LiveSynth. SMatch according to an embodiment is able to finish more than 70% of the changes in less than 30 s, while LiveSynth can only finish 31% in that time, mostly changes that affect a very small number of gates.

In Vivado, there is no incremental synthesis step, the incremental flow uses a full synthesis and then runs incremental placement and routing, trying to leverage existing results for those steps. This explains the large portion of synthesis for Vivado runtime results.

Figure 12A:
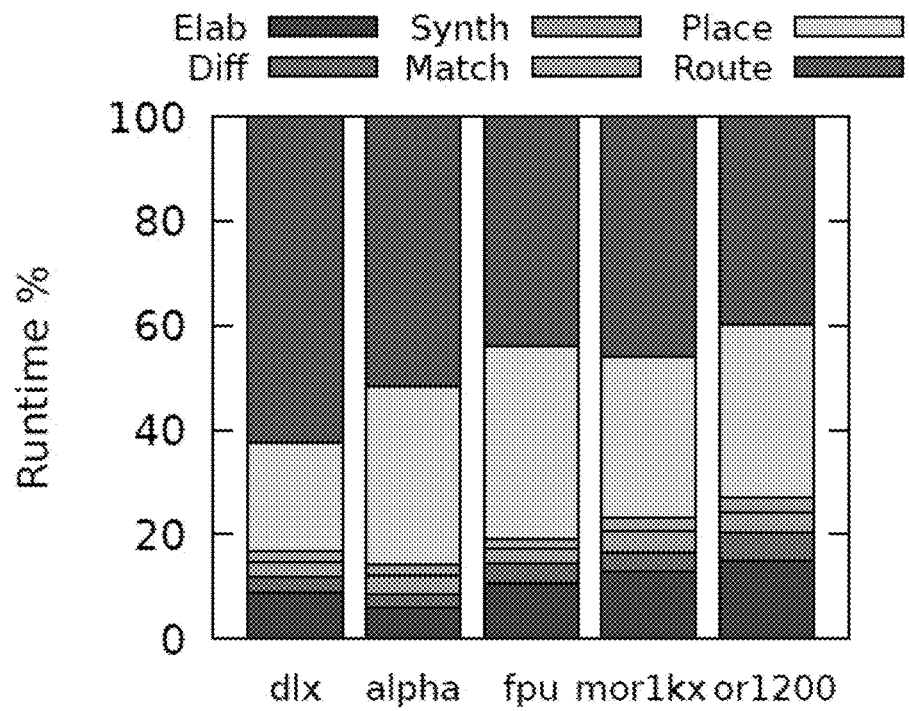
FIG. 12A is a plot that illustrates the runtime for each flow, similar to FIG. 11, for each benchmark in the Anubis suite, averaged across all changes and broken down by step in the flow focusing specifically on SMatch and normalized to 100%, according to an embodiment.
Figure 12B:
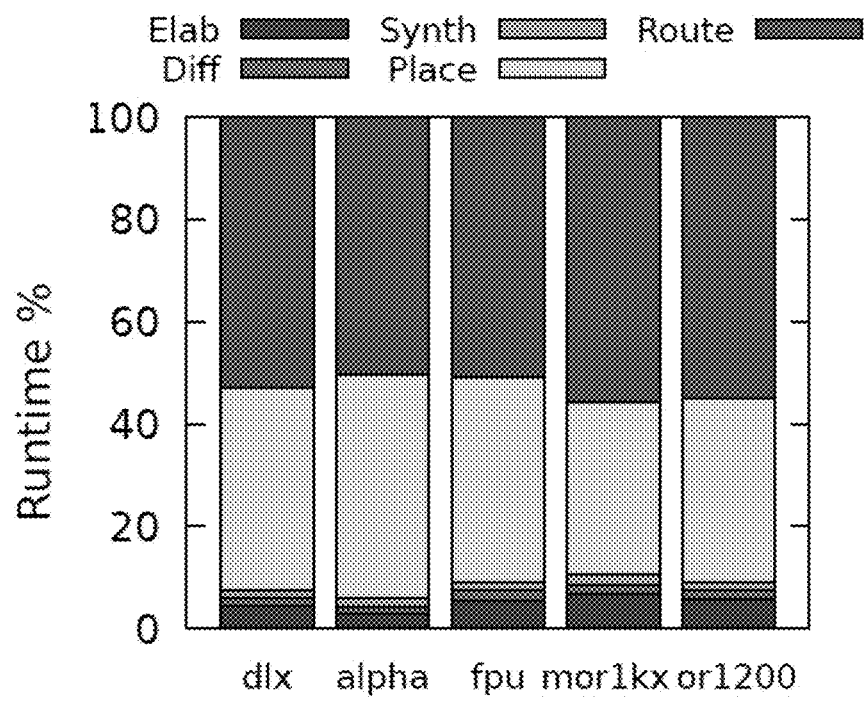
FIG. 12B is a plot that illustrates the runtime for each flow, similar to FIG. 11, for each benchmark in the Anubis suite, averaged across all changes and broken down by step in the flow focusing specifically on LiveSynth and normalized to 100%, according to an embodiment.

FIG. 12A is a plot that illustrates the runtime for each flow, similar to FIG. 11, for each benchmark in the Anubis suite, averaged across all changes and broken down by step in the flow focusing specifically on SMatch and normalized to 100%, according to an embodiment. On the other hand, FIG. 12B is a plot that illustrates the runtime for each flow, similar to FIG. 11, for each benchmark in the Anubis suite, averaged across all changes and broken down by step in the flow focusing specifically on LiveSynth and normalized to 100%, according to an embodiment. It will be appreciated from FIGS. 12A and 12B that most of the time is spent in placement and routing. Even though the amount of routing is minimized, the experiment still relies on Vivado's placer and router, which even in incremental mode is meant to maximize QoR at all costs. This is true for both flows, but is more noticeable in LiveSynth, since there are more wires to route in that case. According to an embodiment, SMatch trades off an added step, namely the SMatch embodiment of step 721, shown in method 601, by reduced placement and routing times. The stitch phase of LiveSynth is not visible on FIG. 12B since it only takes a few milliseconds. The main difference between Vivado flow and the other two is that since Vivado performs full synthesis, there is usually a larger number of gates that is affected even after small changes.

The LiveSynth speedup comes from two different places. First, LiveSynth reduces the amount of work during synthesis. Then, untouched gates are kept in its original placement, and only changed blocks are re-placed and re-routed. Thus, there is also a reduction in the amount of gates that need to be placed and routed. On the other hand, it will be appreciated by those skilled in the art that the SMatch process, according to an embodiment, reuses placement and routing of a cone or a block even if the value of a programmable parameter has changed, as long as there is a structural equivalent from the revised or second structural netlist that matches to the first or original netlist. As a non-limiting example, if a gate was changed from an AND logic operator to an OR logic operator within the gate by virtue of a different LUT, but the same inputs and same outputs remain, the method, according to an embodiment, does not re-place and re-route the cone that embodies that gate. Instead, the functionality of the gate is updated from an AND to an OR by updating the LUT and the placing and routing remains untouched. According to another embodiment, the SMatch process may reuse the placement and routing of a cone or a block, or parts of a cone or a block. It will be appreciated by those skilled in the art that, as noted elsewhere in this document, the SMatch process, according to an embodiment, is applicable to any cell or gate, even when the architecture of the device does not use LUTs. In a non-limiting example, when changing an AND gate for an OR gate in a revision to an application specific integrated circuit (ASIC) design, the SMatch process according to an embodiment is still applicable.

It may be appreciated that in LiveSynth, according to the prior art, it was possible to limit how much placement and routing was done because a known percentage of the circuit remained unchanged; but a gate was considered not-matching if only the LUT is updated. Then, it may be further noted, that the SMatch process, according to an embodiment, can reuse the placement and routing of changed gates in addition to unchanged gates, provided that the cone that embodies the changed gates remains structurally unchanged.

It is noted in FIG. 12A, that in the SMatch process, according to an embodiment, the time spent in place and route is proportionally smaller than in LiveSynth illustrated in FIG. 12B. Placement account for only about 20% of the runtime and routing for an average of under 50% of runtime in the SMatch flow. By way of comparison, this divergence from the prior art can be appreciated by checking how much time it takes to update a LUT as opposed to place and or route LUTs.

Figure 13:
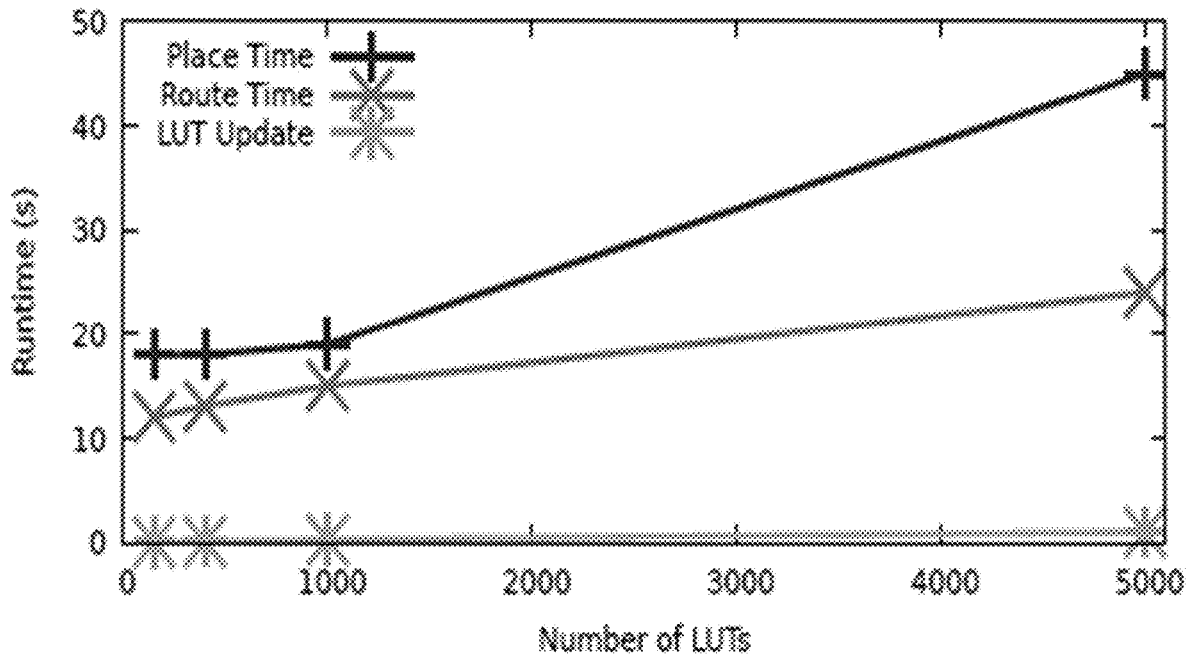
FIG. 13 is a plot that illustrates an example of the place and route times compared to an LUT update runtime; according to an embodiment.

FIG. 13 is a plot that illustrates an example of the place and route times compared to an LUT update runtime; according to an embodiment. FIG. 13 shows the relative runtime of different tasks with respect to the number of gates that need to be updated. It will be noted that simply updating a LUT's functionality after SMatch is much faster than placing and routing said LUT. Therefore, it is advantageous to structurally match as many LUTs as possible and reduce the amount of placement and routing.

Figure 14:
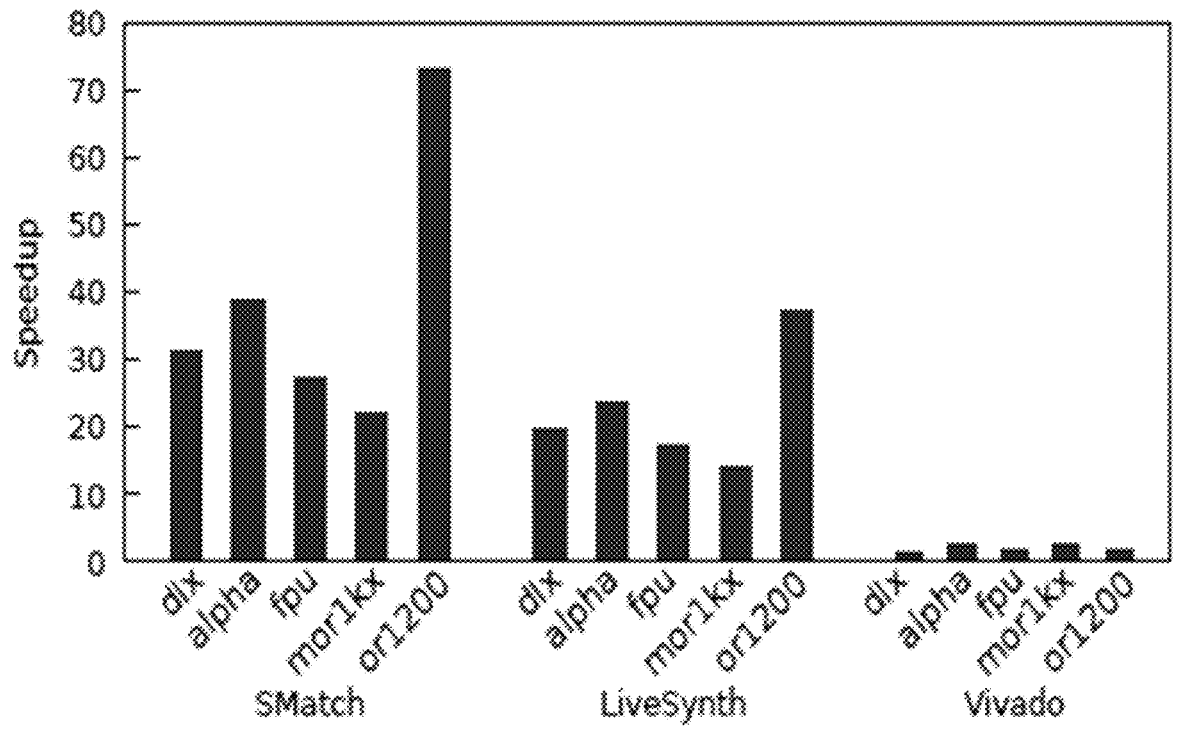
FIG. 14 is a plot that illustrates an example of the speedup of each incremental flow (SMatch, LiveSynth, Vivado) compared to the equivalent full flow, according to an embodiment.

FIG. 14 is a plot that illustrates an example of the speedup of each incremental flow (SMatch, LiveSynth, Vivado) compared to the equivalent full flow, according to an embodiment. In the example of FIG. 14 a design was fully synthesized, placed and routed, and then three operations were performed independently, in a varying number of LUTs: change LUT functionality, place re-place LUTs, re-route LUTs, according to an embodiment. This was performed for ≈100, 400, 1000 and 5000 LUTs, since those are in the typical range for incremental synthesis.

The speedup of each incremental flow was compared to the equivalent full flow. Thus, the incremental flow on Vivado was compared with a full synthesis, placement, and routing in Vivado. According to an embodiment, SMatch and LiveSynth were compared with full synthesis in Yosys, plus placement and routing in Vivado. The overall speedup when running SMatch is over 20 times faster than a full synthesis, placement, and routing run. It is also at least 1.6 times and up to 300 times faster than full synthesis (maximum achieved when place and route are reduced to zero during the incremental phases). SMatch is also 1.5 to 2 times faster than LiveSynth, when performing placement and routing only over the gates within invariant cones touched by the code change.

When comparing the incremental mode of Vivado, it is only 30-80% faster on average than the full mode, being slower in some cases. It will be noted that Vivado, according to the prior art, does not have an incremental step for synthesis, but only for placement and routing, thus Vivado needs to run full synthesis at each change. The main reason for the relatively low speedup obtained (illustrated in FIG. 14) is that Vivado takes a different approach to incremental synthesis, making sure that QoR is kept compatible with the full flow, therefore, even the incremental placement and routing available in Vivado are sometimes as slow as the full synthesis.

3.7. QoR Degradation

Figure 15:
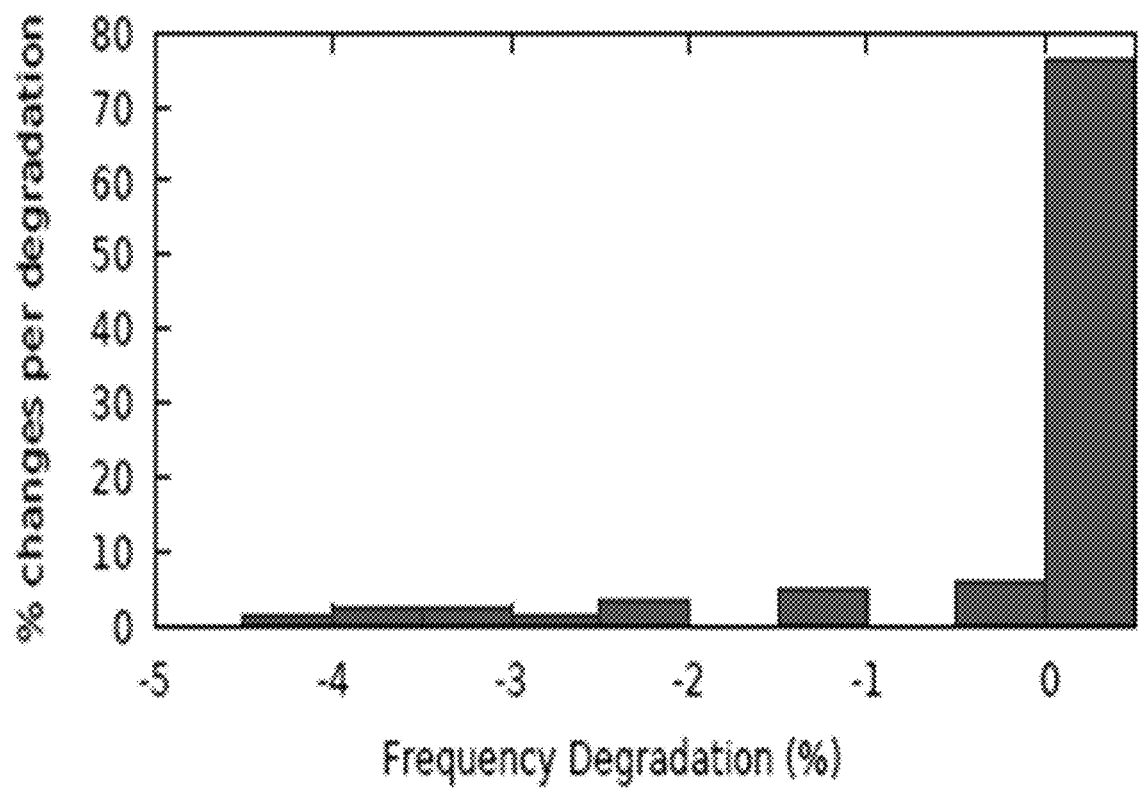
FIG. 15 is a histogram plot that illustrates the frequency degradation of all the changes in the Anubis benchmark, according to an embodiment.

FIG. 15 is a histogram plot that illustrates an example of the frequency degradation of all the changes in the Anubis benchmark, according to an embodiment. In yet another experiment, SMatch, according to an embodiment, was compared against the full baseline flow (synthesis, placement, and routing). It will be noted that in some cases there was degradation where there was an increase in frequency, but those cases are reported as 0% degradation, since those are not due to SMatch, according to an embodiment. However, increases of up to 3% in frequency were observed throughout the experiment. The maximum observed decrease in frequency was about 5% and more than 80% of the changes had frequency changes less than 0.5%.

In this experiment, the degradation of running SMatch versus a full synthesis in Yosys, plus placement and routing in Vivado, were compared. FIG. 15 shows what percentage of changes, combining all benchmarks, observed a given amount of delay degradation. As a non-limiting example, over 70% had no delay degradation and only about 5% of the changes had a degradation of about 1% in delay. The high number of changes observed with no degradation in the non-limiting example is in part due to some changes not affecting the critical path, and thus no change is observed. It will be noted that a comparison between the basic Vivado flow and the flows synthesized in Yosys with Vivado place and route is not included herein because the numbers fluctuate significantly, with Yosys being faster in 2 out of 5 cases.

It may be appreciated, that in this non-limiting example, the small degradation in quality is compatible with providing fast feedback for small changes even with small degradation in QoR. In some embodiments, this gap can be closed with a final step of full synthesis, while in other embodiments, this small degradation is within acceptable ranges.

3.8. Setup Overhead

According to an embodiment, the illustrated embodiment of method 701 (or SMatch) may comprise a setup step that is performed once before the incremental steps are performed. According to another embodiment, a single setup step can be used across multiple incremental updates, although it may present undesirable overhead in some embodiments.

According to an embodiment, the setup step includes a full synthesis, placement and routing, and finding invariant boundaries, similar to step 711 and 713. It may be appreciated that in some embodiments the synthesis, placement and routing times are not exactly overhead, since they would be performed before the change.

In yet another embodiment, step 713, the routine to find the invariant boundaries, is the only added task, comprising a netlist after elaboration and a netlist after synthesis. It may be appreciated as a non-limiting example, that in some experiments, determining the invariant boundaries of step takes about twice as much as the synthesis alone. In the non-limiting examples mentioned above, step 713 ranged from 120 to 480 seconds. However, this overhead can be amortized over multiple incremental changes, and thus can be considered negligible.

3.9. Performance Summary

The illustrated embodiment, called SMatch, builds upon the idea of live turnaround previously proposed for synthesis, but attacks long placement and routing times, while still looking at logic synthesis techniques. In particular, structurally matched LUTs only have their contents replaced, not their placement and routing, leveraging existing placement and routing from previous runs. SMatch is up to 20 times faster than existing incremental commercial flows with minimal QoR impact.

The SMatch approach is based on the fact that the same placement and routing yields good QoR if the structure and connections are the same. Leveraging existing techniques, the method starts from a reduced synthesis block, and then only matches a reduced number of cells. The small degradation of QoR is within acceptable levels and does not limit the ability of a designer to estimate the impacts of code changes in the design. Moreover, in emulation, those small reductions can be tolerated if the number of cycles emulated is not excessive.

4. COMPUTATIONAL HARDWARE OVERVIEW

Figure 16:
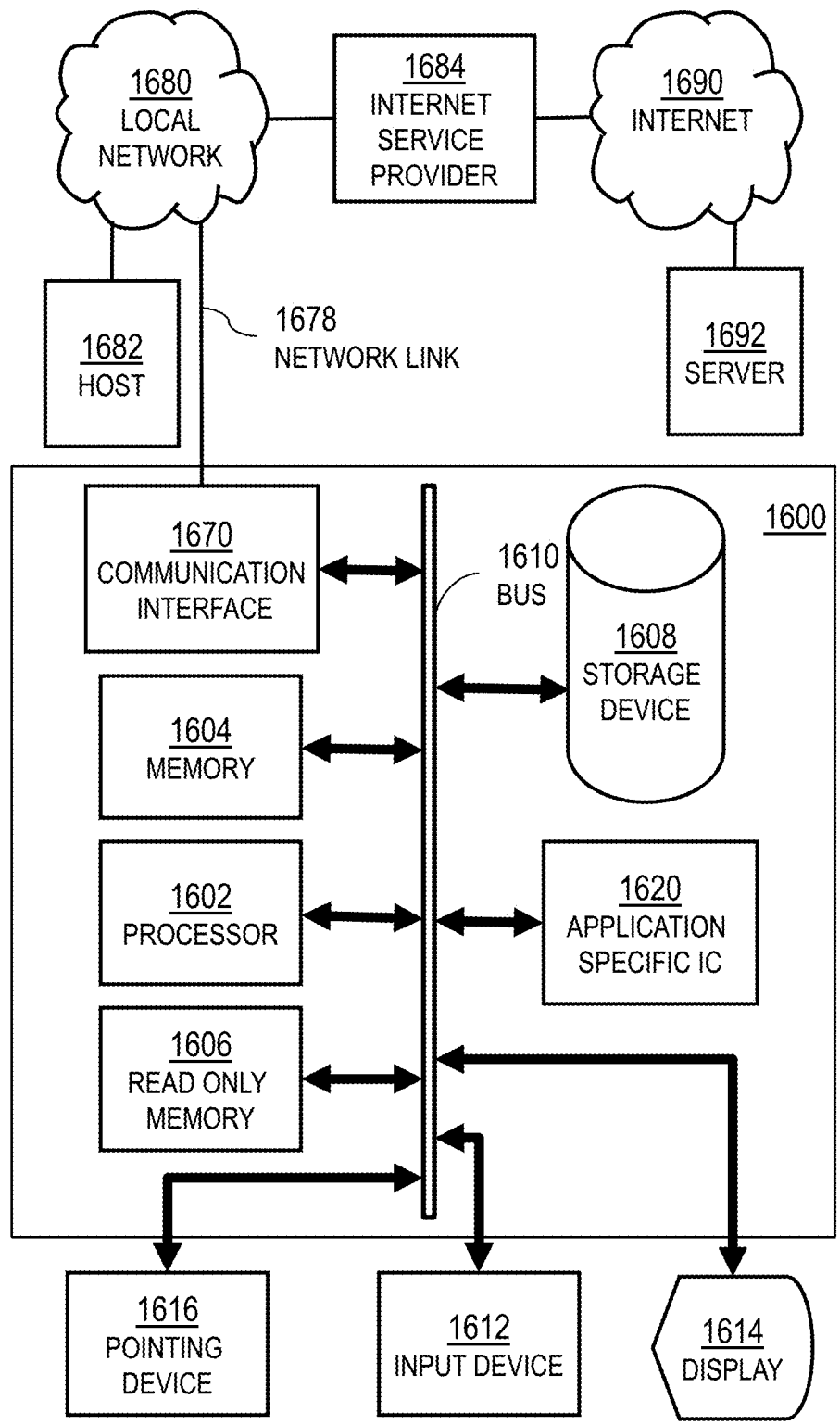
FIG. 16 is a block diagram that illustrates a computer system 1600 upon which an embodiment of the invention may be implemented.

FIG. 16 is a block diagram that illustrates a computer system 1600 upon which an embodiment of the invention may be implemented. Computer system 1600 includes a communication mechanism such as a bus 1610 for passing information between other internal and external components of the computer system 1600. Information is represented as physical signals of a measurable phenomenon, typically electric voltages, but including, in other embodiments, such phenomena as magnetic, electromagnetic, pressure, chemical, molecular atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 1600, or a portion thereof, constitutes a means for performing one or more steps of one or more methods described herein.

A sequence of binary digits constitutes digital data that is used to represent a number or code for a character. A bus 1610 includes many parallel conductors of information so that information is transferred quickly among devices coupled to the bus 1610. One or more processors 1602 for processing information are coupled with the bus 1610. A processor 1602 performs a set of operations on information. The set of operations include bringing information in from the bus 1610 and placing information on the bus 1610. The set of operations also typically include comparing two or more units of information, shifting positions of units of information, and combining two or more units of information, such as by addition or multiplication. A sequence of operations to be executed by the processor 1602 constitutes computer instructions.

Computer system 1600 also includes a memory 1604 coupled to bus 1610. The memory 1604, such as a random access memory (RAM) or other dynamic storage device, stores information including computer instructions. Dynamic memory allows information stored therein to be changed by the computer system 1600. RAM allows a unit of information stored at a location called a memory address to be stored and retrieved independently of information at neighboring addresses. The memory 1604 is also used by the processor 1602 to store temporary values during execution of computer instructions. The computer system 1600 also includes a read only memory (ROM) 1606 or other static storage device coupled to the bus 1610 for storing static information, including instructions, that is not changed by the computer system 1600. Also coupled to bus 1610 is a non-volatile (persistent) storage device 1608, such as a magnetic disk or optical disk, for storing information, including instructions, that persists even when the computer system 1600 is turned off or otherwise loses power.

Information, including instructions, is provided to the bus 1610 for use by the processor from an external input device 1612, such as a keyboard containing alphanumeric keys operated by a human user, or a sensor. A sensor detects conditions in its vicinity and transforms those detections into signals compatible with the signals used to represent information in computer system 1600. Other external devices coupled to bus 1610, used primarily for interacting with humans, include a display device 1614, such as a cathode ray tube (CRT) or a liquid crystal display (LCD), for presenting images, and a pointing device 1616, such as a mouse or a trackball or cursor direction keys, for controlling a position of a small cursor image presented on the display 1614 and issuing commands associated with graphical elements presented on the display 1614.

In the illustrated embodiment, special purpose hardware, such as an application specific integrated circuit (IC) 1620, is coupled to bus 1610. The special purpose hardware is configured to perform operations not performed by processor 1602 quickly enough for special purposes. Examples of application specific ICs include graphics accelerator cards for generating images for display 1614, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 1600 also includes one or more instances of a communications interface 1670 coupled to bus 1610. Communication interface 1670 provides a two-way communication coupling to a variety of external devices that operate with their own processors, such as printers, scanners and external disks. In general, the coupling is with a network link 1678 that is connected to a local network 1680 to which a variety of external devices with their own processors are connected. For example, communication interface 1670 may be a parallel port or a serial port or a universal serial bus (USB) port on a personal computer. In some embodiments, communications interface 1670 is an integrated services digital network (ISDN) card or a digital subscriber line (DSL) card or a telephone modem that provides an information communication connection to a corresponding type of telephone line. In some embodiments, a communication interface 1670 is a cable modem that converts signals on bus 1610 into signals for a communication connection over a coaxial cable or into optical signals for a communication connection over a fiber optic cable. As another example, communications interface 1670 may be a local area network (LAN) card to provide a data communication connection to a compatible LAN, such as Ethernet. Wireless links may also be implemented. Carrier waves, such as acoustic waves and electromagnetic waves, including radio, optical and infrared waves travel through space without wires or cables. Signals include man-made variations in amplitude, frequency, phase, polarization or other physical properties of carrier waves. For wireless links, the communications interface 1670 sends and receives electrical, acoustic or electromagnetic signals, including infrared and optical signals, that carry information streams, such as digital data.

The term computer-readable medium is used herein to refer to any medium that participates in providing information to processor 1602, including instructions for execution. Such a medium may take many forms, including, but not limited to, non-volatile media, volatile media and transmission media. Non-volatile media include, for example, optical or magnetic disks, such as storage device 1608. Volatile media include, for example, dynamic memory 1604. Transmission media include, for example, coaxial cables, copper wire, fiber optic cables, and waves that travel through space without wires or cables, such as acoustic waves and electromagnetic waves, including radio, optical and infrared waves. The term computer-readable storage medium is used herein to refer to any medium that participates in providing information to processor 1602, except for transmission media.

Common forms of computer-readable media include, for example, a floppy disk, a flexible disk, a hard disk, a magnetic tape, or any other magnetic medium, a compact disk ROM (CD-ROM), a digital video disk (DVD) or any other optical medium, punch cards, paper tape, or any other physical medium with patterns of holes, a RAM, a programmable ROM (PROM), an erasable PROM (EPROM), a FLASH-EPROM, or any other memory chip or cartridge, a carrier wave, or any other medium from which a computer can read. The term non-transitory computer-readable storage medium is used herein to refer to any medium that participates in providing information to processor 1602, except for carrier waves and other signals.

Logic encoded in one or more tangible media includes one or both of processor instructions on a computer-readable storage media and special purpose hardware, such as ASIC 1620.

Network link 1678 typically provides information communication through one or more networks to other devices that use or process the information. For example, network link 1678 may provide a connection through local network 1680 to a host computer 1682 or to equipment 1684 operated by an Internet Service Provider (ISP). ISP equipment 1684 in turn provides data communication services through the public, world-wide packet-switching communication network of networks now commonly referred to as the Internet 1690. A computer called a server 1692 connected to the Internet provides a service in response to information received over the Internet. For example, server 1692 provides information representing video data for presentation at display 1614.

The invention is related to the use of computer system 1600 for implementing the techniques described herein. According to one embodiment of the invention, those techniques are performed by computer system 1600 in response to processor 1602 executing one or more sequences of one or more instructions contained in memory 1604. Such instructions, also called software and program code, may be read into memory 1604 from another computer-readable medium such as storage device 1608. Execution of the sequences of instructions contained in memory 1604 causes processor 1602 to perform the method steps described herein. In alternative embodiments, hardware, such as application specific integrated circuit 1620, may be used in place of or in combination with software to implement the invention. Thus, embodiments of the invention are not limited to any specific combination of hardware and software.

The signals transmitted over network link 1678 and other networks through communications interface 1670, carry information to and from computer system 1600. Computer system 1600 can send and receive information, including program code, through the networks 1680, 1690 among others, through network link 1678 and communications interface 1670. In an example using the Internet 1690, a server 1692 transmits program code for a particular application, requested by a message sent from computer 1600, through Internet 1690, ISP equipment 1684, local network 1680 and communications interface 1670. The received code may be executed by processor 1602 as it is received or may be stored in storage device 1608 or other non-volatile storage for later execution, or both. In this manner, computer system 1600 may obtain application program code in the form of a signal on a carrier wave.

Various forms of computer readable media may be involved in carrying one or more sequence of instructions or data or both to processor 1602 for execution. For example, instructions and data may initially be carried on a magnetic disk of a remote computer such as host 1682. The remote computer loads the instructions and data into its dynamic memory and sends the instructions and data over a telephone line using a modem. A modem local to the computer system 1600 receives the instructions and data on a telephone line and uses an infra-red transmitter to convert the instructions and data to a signal on an infra-red a carrier wave serving as the network link 1678. An infrared detector serving as communications interface 1670 receives the instructions and data carried in the infrared signal and places information representing the instructions and data onto bus 1610. Bus 1610 carries the information to memory 1604 from which processor 1602 retrieves and executes the instructions using some of the data sent with the instructions. The instructions and data received in memory 1604 may optionally be stored on storage device 1608, either before or after execution by the processor 1602.

Figure 17:
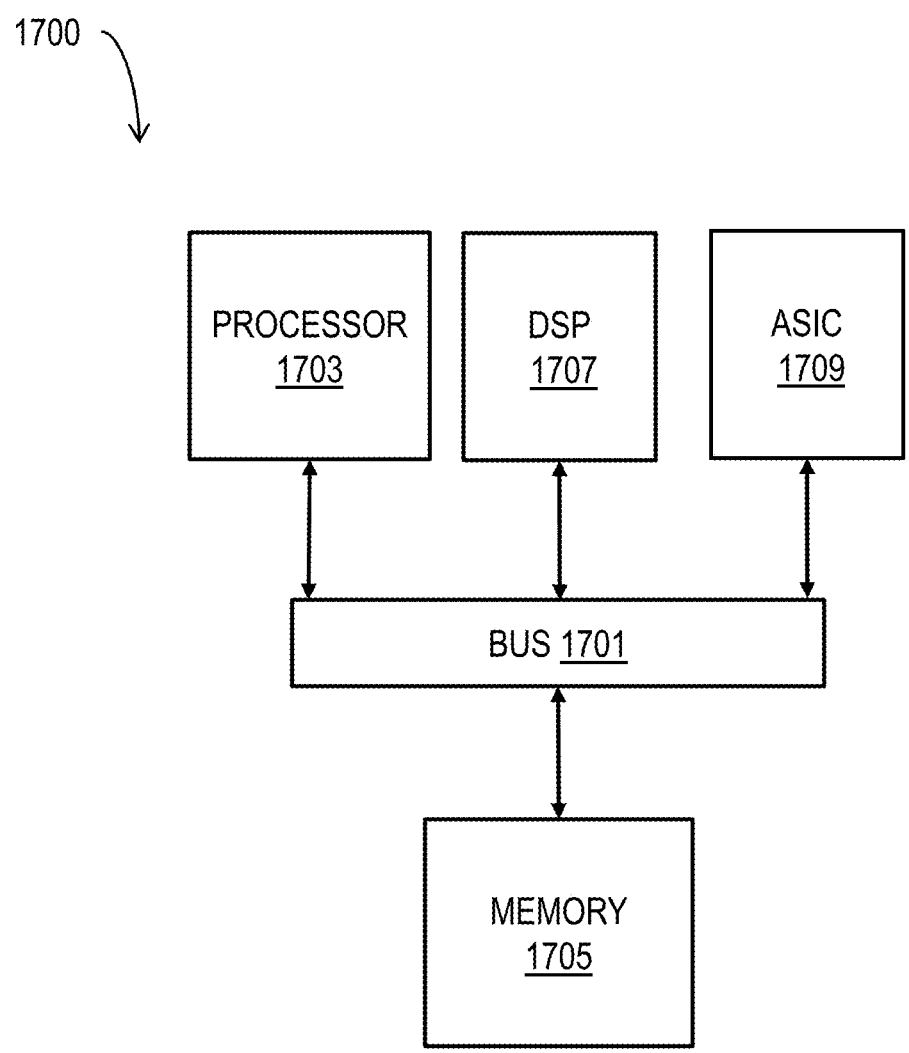
FIG. 17 is block diagram that illustrates a chip set 1700 upon which an embodiment of the invention may be implemented.

FIG. 17 illustrates a chip set 1700 upon which an embodiment of the invention may be implemented. Chip set 1700 is programmed to perform one or more steps of a method described herein and includes, for instance, the processor and memory components described with respect to FIG. 16 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip. Chip set 1700, or a portion thereof, constitutes a means for performing one or more steps of a method described herein.

In one embodiment, the chip set 1700 includes a communication mechanism such as a bus 1701 for passing information among the components of the chip set 1700. A processor 1703 has connectivity to the bus 1701 to execute instructions and process information stored in, for example, a memory 1705. The processor 1703 may include one or more processing cores with each core configured to perform independently. A multi-core processor enables multiprocessing within a single physical package. Examples of a multi-core processor include two, four, eight, or greater numbers of processing cores. Alternatively, or in addition, the processor 1703 may include one or more microprocessors configured in tandem via the bus 1701 to enable independent execution of instructions, pipelining, and multithreading. The processor 1703 may also be accompanied with one or more specialized components to perform certain processing functions and tasks such as one or more digital signal processors (DSP) 1707, or one or more application-specific integrated circuits (ASIC) 1709. A DSP 1707 typically is configured to process real-world signals (e.g., sound) in real time independently of the processor 1703. Similarly, an ASIC 1709 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 1703 and accompanying components have connectivity to the memory 1705 via the bus 1701. The memory 1705 includes both dynamic memory (e.g., RAM, magnetic disk, writable optical disk, etc.) and static memory (e.g., ROM, CD-ROM, etc.) for storing executable instructions that when executed perform one or more steps of a method described herein. The memory 1705 also stores the data associated with or generated by the execution of one or more steps of the methods described herein.

5. ALTERNATIVES, DEVIATIONS AND MODIFICATIONS

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense. Throughout this specification and the claims, unless the context requires otherwise, the word "comprise" and its variations, such as "comprises" and "comprising," will be understood to imply the inclusion of a stated item, element or step or group of items, elements or steps but not the exclusion of any other item, element or step or group of items, elements or steps. Furthermore, the indefinite article "a" or "an" is meant to indicate one or more of the item, element or step modified by the article.

6. REFERENCES

[1] Raman et al. 2009, "Cone Resynthesis ECO Methodology for Multi-Million Gate Designs".

[2] Altera Inc. 2006. Altera: FPGA Architecture White Paper. at domain altera.com in folder en_US subfolder pdfs subfolder literature subfolder wp with filename wp-01003.pdf. (July 2006).

[3] Altera Inc. 2016. Quartus Prime Standard Edition Handbook Volume 1: Design and Synthesis. at domain .altera.com in folder en_US sufolder pdfs/literature subfolder hb subfolder qts with filename qts-qps-handbook.pdf. (March 2016).

[4] Altera Inc., Intel. 2017. Cyclone V Device Overview. at domain altera.com in folder content subfolder dam subfolder altera-www subfolder global subfolder en_US sufolder pdfs/literature subfolder hb subfolder cyclone-v with filename cv_51001.pdf. (December 2017).

[5] Daniel Brand, Anthony Drumm, Sandip Kundu, and Prakash Narain. 1994. Incremental Synthesis. In Proc. of the 1994 IEEE/ACM Int'l Conf. on Computer-aided Design (ICCAD '94). IEEE Computer Society, Los Alamitos, Calif., USA, 14-18.

[6] Robert Brayton and Alan Mishchenko. 2010. ABC: An Academic Industrial-strength Verification Tool. In Proceedings of the 22Nd International Conference on Computer Aided Verification (CAV'10). Springer-Verlag, Berlin, Heidelberg, 24-40.

[7] Doris Chen and Deshanand Singh. 2011. Line-level Incremental Resynthesis Techniques for FPGAs. In Proceedings of the 19th ACM/SIGDA International Symposium on Field Programmable Gate Arrays (FPGA '11). ACM, New York, N.Y., USA, 133-142. DOI: at domain doi.org in fodler 10.1145 with filename 1950413.1950442

[8] Jason Cong, Jie Fang, and Kei-Yong Khoo. 1999. An Implicit Connection Graph Maze Routing Algorithm for ECO Routing. In Proceedings of the 1999 IEEE/ACM International Conference on Computer-aided Design (ICCAD '99). IEEE Press, Piscataway, N.J., USA, 163-167.

[9] J. Cortadella, M. Galceran-Oms, M. Kishinevsky, and S. S. Sapatnekar. 2015. RTL Synthesis: From Logic Synthesis to Automatic Pipelining. Proc. IEEE 103, 11 (November 2015), 2061-2075. DOI at domain doi.org in folder 10.1109 filename JPROC.2015.2456189

[10] Mehrdad Eslami Dehkordi, S. D. Brown, and T. Borer. 2006. Modular Partitioning for Incremental Compilation. In Field Programmable Logic and Applications, 2006. FPL '06. International Conference on. 1-6. DOI: at domain doi.org in folder 10.1109 with filename FPL.2006.311202

[11] Ilya Ganusov, Henri Fraisse, Aaron Ng, Rafael T. Possignolo, and Sabya Das. 2016. Automated Extra Pipeline Analysis of Applications Mapped to Xilinx UltraScale+FPGAs. In Field Programmable Logic and Applications (FPL), Proceedings of the 26th Conference on.
[12] T. W. Huang and M. D. F. Wong. 2015. OpenTimer: A high-performance timing analysis tool. In 2015 IEEE/ACM International Conference on Computer-Aided Design (ICCAD). 895-902.
[13] Aaron P. Hurst, Alan Mishchenko, and Robert K. Brayton. 2007. Fast Minimum-Register Retiming via Binary Maximum-Flow. In Proceedings of the Formal Methods in Computer Aided Design (FMCAD '07). IEEE Computer Society, Washington, D.C., USA, 181-187.
[14] Norman P Jouppi. 1987. Timing analysis and performance improvement of MOS VLSI designs. Computer-Aided Design of Integrated Circuits and Systems, IEEE Transactions on 6, 4 (1987), 650-665.
[15] Donggyu Kim, Adam Izraelevitz, Christopher Celio, Hokeun Kim, Brian Zimmer, Yunsup Lee, Jonathan Bachrach, and Krste Asanović. 2016. Strober: Fast and Accurate Sample-based Energy Simulation for Arbitrary RTL. In Proceedings of the 43rd International Symposium on Computer Architecture (ISCA '16). IEEE Press, Piscataway, N.J., USA, 128-139.
[16] P. Y. Lee, I. H. R. Jiang, C. R. Li, W. L. Chiu, and Y. M. Yang. 2015. iTimerC2.0: Fast incremental timing and CPPR analysis. In 2015 IEEE/ACM International Conference on Computer-Aided Design (ICCAD). 890-894. DOI: https://doi.org/10.1109/ICCAD.2015.7372665
[17] C. E. Leiserson and J. B. Saxe. 1991. Retiming Synchronous Circuitry. Algorithmica 6 (1991), 5-35. Issue 1-6.
[18] N. A. Modi and M. Marek-Sadowska. 2008. ECO-Map: Technology remapping for post-mask ECO using simulated annealing. In 2008 IEEE International Conference on Computer Design. 652-657.
[19] Rafael T. Possignolo, Elnaz Ebrahimi, Haven Skinner, and Jose Renau. 2016. FluidPipelines: Elastic Circuitry meets Out-of-Order Execution. In Computer Design (ICCD), Proceedings of the 34th International Conference on.
[20] Rafael T. Possignolo, Nursultan Kabylkas, and Jose Renau. 2017. Anubis: A New Benchmark for Incremental Synthesis. In Logic Synthesis (IWLS), Proceedings of the 2017 International Workshop on.
[21] Rafael T. Possignolo and Jose Renau. 2017. LiveSynth: Towards an interactive synthesis flow. In 53rd Design Automation Conference, Proceedings of the.
[22] P. W. Sathyanathan, W. He, and T. H. Tzen. 2017. Incremental whole program optimization and compilation. In 2017 IEEE/ACM International Symposium on Code Generation and Optimization (CGO). 221-232. DOI: https://doi.org/10.1109/CGO.2017.7863742
[23] Clifford Wolf. 2016. Yosys Open SYnthesis Suite. at domain clifford. at in folder yosys". (2016).
[24] Xilinx Inc. 2015. Vivado Synthesis—Strategies for reducing run time. at domain .xilinx.com folder support subfolder answers with filename 62215.html. (2015).
[25] Xilinx Inc. 2016. Vivado Design Suite User Guide. at domain.xilinx.com in folder support subfolder documentation subfolder sw_manuals subfolder xilinx2016_1 with filename ug910-vivado-getting-started.pdf. (April 2016).

What is claimed is:

1. A method for constructing an electronic circuit, the method comprising:

retrieving from a computer-readable medium a first structural netlist data structure that indicates electronic components and connections therebetween for a first electronic circuit;

retrieving from the computer-readable medium a first placed and routed netlist data structure that indicates physical placement of the electronic components and physical routing of connections therebetween for the electronic components and the connections in the first structural netlist data structure;

retrieving from the computer-readable medium a second structural netlist data structure that indicates electronic components and connections therebetween for a different second electronic circuit;

finding for each component in the second structural netlist data structure, using a processor, a matching component, if any, in the first structural netlist data structure based on type of component and inputs that are output from other matching components; and, generating, using a processor, a different second placed and routed netlist data structure that indicates physical placement of components and physical routing of connections for the second electronic circuit by deriving new placement of components and new routing of connections only for components in the second structural netlist data structure for which matching components are not found in the first structural netlist data structure.

2. The method as recited in claim 1, the method further comprising causing the electronic circuit to be constructed according to the second placed and routed netlist data structure.

3. The method as recited in claim 1, wherein said finding the matching component is performed without regard to a value of a programmable parameter of the component.

4. The method as recited in claim 2, wherein:
the electronic components are field programmable gates; and
causing the electronic circuit to be constructed further comprises using the processor to program automatically a field programmable gate array.

5. The method as recited in claim 3, wherein:
the matching component is a field programmable gate; and
the value of the programmable parameter is a look up table for the field programmable gate.

6. The method as recited in claim 1, further comprising:
retrieving from the computer-readable medium a first elaboration netlist data structure that indicates connected functions for the first electronic circuit, wherein the first elaboration netlist data structure is used to generate the first structural netlist data structure;
determining automatically on the processor a functional invariant boundary in the first elaboration netlist data structure;
retrieving from the computer-readable medium a second elaboration netlist data structure that indicates connected functions for the second electronic circuit, wherein the second elaboration netlist data structure is used to generate the second structural netlist data structure; and
determining automatically on the processor a cone of components in the first elaboration netlist data structure based on the functional invariant boundary such that at least one component or connection in the cone of components is different in the second elaboration netlist data structure;

wherein
said step of finding the matching component is performed only for components in the cone of components, and
said step of generating the second placed and routed netlist data structure further comprises including, from the first placed and routed netlist data structure, all components and connections outside the cone of components.

7. A non-transitory computer-readable medium carrying one or more sequences of instructions, wherein execution of the one or more sequences of instructions by one or more processors causes the one or more processors to perform the steps of:
retrieving from a computer-readable medium a first structural netlist data structure that indicates electronic components and connections therebetween for a first electronic circuit;
retrieving from the computer-readable medium a first placed and routed netlist data structure that indicates physical placement of the electronic components and physical routing of connections therebetween for the electronic components and the connections in the first structural netlist data structure;
retrieving from the computer-readable medium a second structural netlist data structure that indicates electronic components and connections therebetween for a different second electronic circuit;
finding for each component in the second structural netlist data structure a matching component, if any, in the first structural netlist data structure based on type of component and inputs that are output from other matching components; and
generating a different second placed and routed netlist data structure that indicates physical placement of components and physical routing of connections for the second electronic circuit by
deriving new placement of components and new routing of connections only for components in the second structural netlist data structure for which matching components are not found in the first structural netlist data structure.

8. The computer-readable medium as recited in claim 7, the method further comprising causing the electronic circuit to be constructed according to the second placed and routed netlist data structure.

9. The computer-readable medium as recited in claim 7, wherein said finding the matching component is performed without regard to a value of a programmable parameter of the component.

10. The computer-readable medium as recited in claim 8, wherein:
the electronic components are field programmable gates; and
causing the electronic circuit to be constructed further comprises programming a field programmable gate array.

11. The computer-readable medium as recited in claim 9, wherein:
the matching component is a field programmable gate; and
the value of the programmable parameter is a look up table for the field programmable gate.

12. The computer-readable medium as recited in claim 7, wherein execution of the one or more sequences of instructions by the one or more processors further causes the one or more processors to perform the steps of:
retrieving from the computer-readable medium a first elaboration netlist data structure that indicates connected functions for the first electronic circuit, wherein the first elaboration netlist data structure is used to generate the first structural netlist data structure;
determining a functional invariant boundary in the first elaboration netlist data structure;
retrieving from the computer-readable medium a second elaboration netlist data structure that indicates connected functions for the second electronic circuit, wherein the second elaboration netlist data structure is used to generate the second structural netlist data structure; and
determining a cone of components in the first elaboration netlist data structure based on the functional invariant boundary such that at least one component or connection in the cone of components is different in the second elaboration netlist data structure;
wherein
said step of finding the matching component is performed only for components in the cone of components, and
said step of generating the second placed and routed netlist data structure further comprises including, from the first placed and routed netlist data structure, all components and connections outside the cone of components.

13. An apparatus comprising:
at least one processor; and
at least one memory including one or more sequences of instructions,
the at least one memory and the one or more sequences of instructions configured to, with the at least one processor, cause the apparatus to perform at least the following,
retrieve from a computer-readable medium a first structural netlist data structure that indicates electronic components and connections therebetween for a first electronic circuit;
retrieve from the computer-readable medium a first placed and routed netlist data structure that indicates physical placement of the electronic components and physical routing of connections therebetween for the electronic components and the connections in the first structural netlist data structure;
retrieve from the computer-readable medium a second structural netlist data structure that indicates electronic components and connections therebetween for a different second electronic circuit;
find, for each component in the second structural netlist data structure, a matching component, if any, in the first structural netlist data structure based on type of component and inputs that are output from other matching components; and
generate a different second placed and routed netlist data structure that indicates physical placement of components and physical routing of connections for the second electronic circuit by deriving new placement of components and new routing of connections only for components in the second structural netlist data structure for which matching components are not found in the first structural netlist data structure.

14. The apparatus as recited in claim 13, the method further comprising causing the electronic circuit to be constructed according to the second placed and routed netlist data structure.

15. The apparatus as recited in claim 13, wherein said finding the matching component is performed without regard to a value of a programmable parameter of the component.

16. The apparatus as recited in claim 14, wherein:
the electronic components are field programmable gates; and
causing the electronic circuit to be constructed further comprises programming a field programmable gate array.

17. The apparatus as recited in claim 15, wherein:
the matching component is a field programmable gate; and
the value of the programmable parameter is a look up table for the field programmable gate.

18. The apparatus as recited in claim 13, the at least one memory and the one or more sequences of instructions are further configured to cause the apparatus to:
retrieve from the computer-readable medium a first elaboration netlist data structure that indicates connected functions for the first electronic circuit, wherein the first elaboration netlist data structure is used to generate the first structural netlist data structure;
determine a functional invariant boundary in the first elaboration netlist data structure;
retrieving from the computer-readable medium a second elaboration netlist data structure that indicates connected functions for the second electronic circuit, wherein the second elaboration netlist data structure is used to generate the second structural netlist data structure; and
determine a cone of components in the first elaboration netlist data structure based on the functional invariant boundary such that at least one component or connection in the cone of components is different in the second elaboration netlist data structure;
wherein
to find the matching component is performed only for components in the cone of components, and
to generate the second placed and routed netlist data structure further comprises to include, from the first placed and routed netlist data structure, all components and connections outside the cone of components.

* * * * *